US012544317B2

(12) United States Patent
Fukuda et al.

(10) Patent No.: US 12,544,317 B2
(45) Date of Patent: Feb. 10, 2026

(54) GASTROSTOMY CATHETER, INSERTION JIG SET, INSERTION JIG AND GASTROSTOMY CATHETER SET

(71) Applicants: SUMITOMO BAKELITE CO., LTD., Shinagawa-ku (JP); Yutaka Suzuki, Chuo-ku (JP)

(72) Inventors: Hiroyuki Fukuda, Akita (JP); Kiyotaka Arikawa, Akita (JP); Minoru Suzuki, Akita (JP); Yutaka Suzuki, Chuo-ku (JP)

(73) Assignees: SUMITOMO BAKELITE CO., LTD., Shinagawa-ku (JP); Yutaka Suzuki, Chuo-ku (JP)

( * ) Notice: Subject to any disclaimer, the term of this patent is extended or adjusted under 35 U.S.C. 154(b) by 1239 days.

(21) Appl. No.: 16/768,788

(22) PCT Filed: Dec. 3, 2018

(86) PCT No.: PCT/JP2018/044360
§ 371 (c)(1),
(2) Date: Jun. 1, 2020

(87) PCT Pub. No.: WO2019/111847
PCT Pub. Date: Jun. 13, 2019

(65) Prior Publication Data

US 2021/0177704 A1 Jun. 17, 2021

(30) Foreign Application Priority Data

Dec. 4, 2017 (JP) ................................ 2017-232868
Aug. 2, 2018 (JP) ................................ 2018-145805
Aug. 21, 2018 (JP) ................................ 2018-154832

(51) Int. Cl.
*C07D 475/06* (2006.01)
*A61J 15/00* (2006.01)
(Continued)

(52) U.S. Cl.
CPC ....... *A61J 15/0015* (2013.01); *A61J 15/0038* (2013.01); *A61J 15/0053* (2013.01)

(58) Field of Classification Search
CPC ................ A61J 15/0015; A61J 15/0038; A61J 15/0053; A61J 15/00; A61M 2025/0233;
(Continued)

(56) References Cited

U.S. PATENT DOCUMENTS 5,273,529 A 12/1993 Idowu
10,342,577 B2 * 7/2019 Worrel ............... A61B 17/3421
(Continued)

FOREIGN PATENT DOCUMENTS

JP 2002-534168 A 10/2002
JP 2003-180841 A 7/2003
(Continued)

OTHER PUBLICATIONS

International Search Report issued on Jan. 29, 2019 in PCT/JP2018/044360 filed on Dec. 3, 2018, 5 pages.

*Primary Examiner* — Michael J Tsai
*Assistant Examiner* — Justin L Zamory
(74) *Attorney, Agent, or Firm* — Oblon, McClelland, Maier & Neustadt, L.L.P.

(57) ABSTRACT

The gastrostomy catheter includes a shaft in which a lumen is provided, a flexible bumper which is provided at a tip of the shaft, and a wire which has elasticity and can bias the bumper in a diameter-increasing direction and restricts deformation of the bumper in a diameter-decreasing direction. At least a portion on a tip side of the wire biases the bumper in the diameter-increasing direction or restricts the deformation of the bumper in the diameter-decreasing direction by the elasticity of the wire in a state in which the wire is disposed in the bumper.

20 Claims, 20 Drawing Sheets

(51) Int. Cl.

| | |
|---|---|
| ***A61K 31/519*** | (2006.01) |
| ***A61K 45/06*** | (2006.01) |
| ***C07D 487/04*** | (2006.01) |

(58) Field of Classification Search

CPC .... A61M 2039/085; A61M 2039/0255; A61M 39/20

See application file for complete search history.

(56) References Cited

U.S. PATENT DOCUMENTS

2008/0097392 A1* 4/2008 DeLegge .............. A61M 25/04 604/523
2017/0056575 A1 3/2017 Hahne et al.

FOREIGN PATENT DOCUMENTS

| | | | |
|---|---|---|---|
| JP | 2005-511206 | A | 4/2005 |
| JP | 2014-68654 | A | 4/2014 |
| JP | 2014-121451 | A | 7/2014 |
| WO | WO 00/40289 | A2 | 7/2000 |
| WO | WO 03/049665 | A1 | 6/2003 |

* cited by examiner

GASTROSTOMY CATHETER, INSERTION JIG SET, INSERTION JIG AND GASTROSTOMY CATHETER SET

TECHNICAL FIELD

The present invention relates to a gastrostomy catheter, an insertion jig set which is used when the gastrostomy catheter is attached into a stomach, an insertion jig, and a gastrostomy catheter set.

Priority is claimed on Japanese Patent Application No. 2017-232868, filed on Dec. 4, 2017, Japanese Patent Application No. 2018-145805, filed on Aug. 2, 2018, and Japanese Patent Application No. 2018-154832, filed on Aug. 21, 2018, the contents of which are incorporated herein by reference.

BACKGROUND ART

In the related art, as gastrostomy catheters, a gastrostomy catheter is known, which is configured to administer a nutrient into a stomach and to place a tip portion of the catheter in the stomach by a gastrointestinal fixing portion (gastrointestinal indwelling device) such as an expandable bumper or balloon in order to maintain a state in which the nutrient can be administered into the stomach.

Specifically, there is a gastrostomy catheter having a bumper of which a diameter is reduced by a rod, as disclosed in PTL 1, or a gastrostomy catheter having a balloon which is inflated or deflated by a fluid such as an aqueous salt solution, as disclosed in Patent Document 2.

When a gastrostomy catheter is attached to a body, it is important to avoid or suppress the gastrointestinal fixing portion from compressing or damaging a wall surface of a fistula, thereby reducing a burden on a subject.

For example, PTL 3 discloses a gastrostomy catheter insertion jig set (described as a gastrostomy instrument in PTL 3) including a cap (described as a capsule in PTL 3) which covers an gastrointestinal fixing portion (described as an internal bolster in PTL 3) and can maintain a state in which the gastrointestinal fixing portion is folded.

In the insertion jig set described in PTL 3, the gastrointestinal fixing portion can be inserted into a stomach through a fistula in a state in which the gastrointestinal fixing portion is folded by a cap, and thus, a burden on a subject is reduced. A hole through which a lip cord (tear string) can pass is formed in this cap. The cap is torn by pulling the lip cord which has passed through the hole, and the state is shifted from a state in which the gastrointestinal fixing portion is restrained to a state in which the gastrointestinal fixing portion is expandable. Accordingly, the gastrointestinal fixing portion is placed into the stomach.

CITATION LIST

Patent Literature

[PTL] Japanese Unexamined Patent Application, First Publication No. 2003-180841

[PTL 2] Published Japanese Translation No. 2002-534168 of the PCT International Publication

[PTL 3] Published Japanese Translation No. 2005-511206 of the PCT International Publication

SUMMARY OF INVENTION

Technical Problem

In the gastrostomy catheter of PTL 1, since it is necessary to stably place the bumper in the stomach, it is difficult to use a highly flexible bumper. Therefore, when the gastrostomy catheter is inserted into the fistula or removed from the fistula, a large resistance may be applied to a wall surface portion of the fistula from the bumper. In order to reduce the burden on the body, it is desirable that the resistance is smaller.

In the balloon catheter of PTL 2, since it is necessary to replace a fluid which fills the balloon, it takes time and effort required for management, and it is difficult to place the balloon catheter for a long time.

In the insertion jig set described in PTL 3, the cap is torn by the lip cord. Accordingly, since there is no mechanism for separating the cap from the gastrointestinal fixing portion, there is a concern that the torn cap is left in a state of being attached to the gastrointestinal fixing portion. In this case, there is a concern that the shifting of the gastrointestinal fixing portion from the folded state to the expanded state may be hindered.

In addition, it is necessary to provide the hole for the lip cord to pass through in the cap, and it is necessary that the cap has a thickness and a material that can be torn by the lip cord. Accordingly, a holding force for maintaining the state in which the gastrointestinal fixing portion is folded may be restricted. For this reason, in a case where this cap is used for a gastrointestinal fixing portion having high elasticity, elastic restoration of the gastrointestinal fixing portion cannot be suppressed. Accordingly, it is possible that the cap is unexpectedly detached from the gastrointestinal fixing portion.

Furthermore, it is difficult for a surgeon to obtain confirmation that the cap is detached from the gastrointestinal fixing portion only by pulling the lip cord.

The present invention is made in consideration of the above-described problems, and object thereof is to provide a gastrostomy catheter capable of reducing time and effort required for management while keeping a resistance applied to a body low and capable of being placed for a relatively long time.

In addition, another object of the present invention is to provide an insertion jig set, an insertion jig, and a gastrostomy catheter set capable of preventing the cap from being unexpectedly detached from the gastrostomy catheter and capable of suitably removing the cap.

Solution to Problem

According to an aspect of the present invention, there is provided a gastrostomy catheter including: a shaft in which a lumen is provided; a flexible bumper which is provided at a tip of the shaft; and a linear member which has elasticity and biases the bumper in a diameter-increasing direction or restricts deformation of the bumper in a diameter-decreasing direction.

According to another aspect of the present invention, there is provided an insertion jig set for inserting a gastrostomy catheter having a foldable gastrointestinal fixing portion at a tip into a body, the insertion jig set including: an insertion jig configured to include a tubular mantle portion and an inner insertion portion which is movable forward and rearward through the mantle portion; the gastrostomy catheter which is attached around the mantle portion; and a cap which is disposed on a tip side of the mantle portion and covers at least a portion of the folded gastrointestinal fixing portion, in which one of the gastrostomy catheter or the mantle portion and the cap has a locking portion which is locked to the other, and the inner insertion portion releases locking by the locking portion when the inner insertion portion moves forward through the mantle portion.

According to still another aspect of the present invention, there is provided an insertion jig for inserting a gastrostomy catheter having a foldable gastrointestinal fixing portion at a tip and a cap covering at least a portion of the folded gastrointestinal fixing portion into a body, the insertion jig including: a tubular mantle portion around which the gastrostomy catheter is attachable; and an inner insertion portion which passes through the mantle portion, in which the mantle portion has a locking portion which is locked to the cap, and the inner insertion portion releases locking by the locking portion when the inner insertion portion moves forward through the mantle portion.

According to still another aspect of the present invention, there is provided a gastrostomy catheter set including: a gastrostomy catheter which has a foldable gastrointestinal fixing portion at a tip; and a cap which covers at least a portion of the folded gastrointestinal fixing portion, in which the gastrostomy catheter is formed so that a portion of an insertion jig for inserting the gastrostomy catheter into the stomach is inserted, and the cap has a locked portion which is locked to the insertion jig.

Advantageous Effects of Invention

According to the gastrostomy catheter of the present invention, the linear member is provided, which can bias the bumper in a diameter-increasing direction or restrict deformation of the bumper in the diameter-decreasing direction. Accordingly, it is possible to use the bumper made of a material which is more flexible than the gastrostomy catheter of the related art. Accordingly, it is possible to suppress a resistance applied to a body when the catheter is inserted or removed to a low level. Moreover, unlike a gastrostomy catheter having a balloon, a fluid is not used. Accordingly, there is no need to replace the fluid. Therefore, compared with the gastrostomy catheter provided with the balloon, time and effort required for management can be reduced, and the gastrostomy catheter can be placed for a relatively long time.

According to the insertion jig set, the insertion jig, and the gastrostomy catheter set of the present invention, it is possible to suitably remove the cap while preventing the cap from being unexpectedly removed from the gastrostomy catheter.

DESCRIPTION OF EMBODIMENTS

Figure 1:
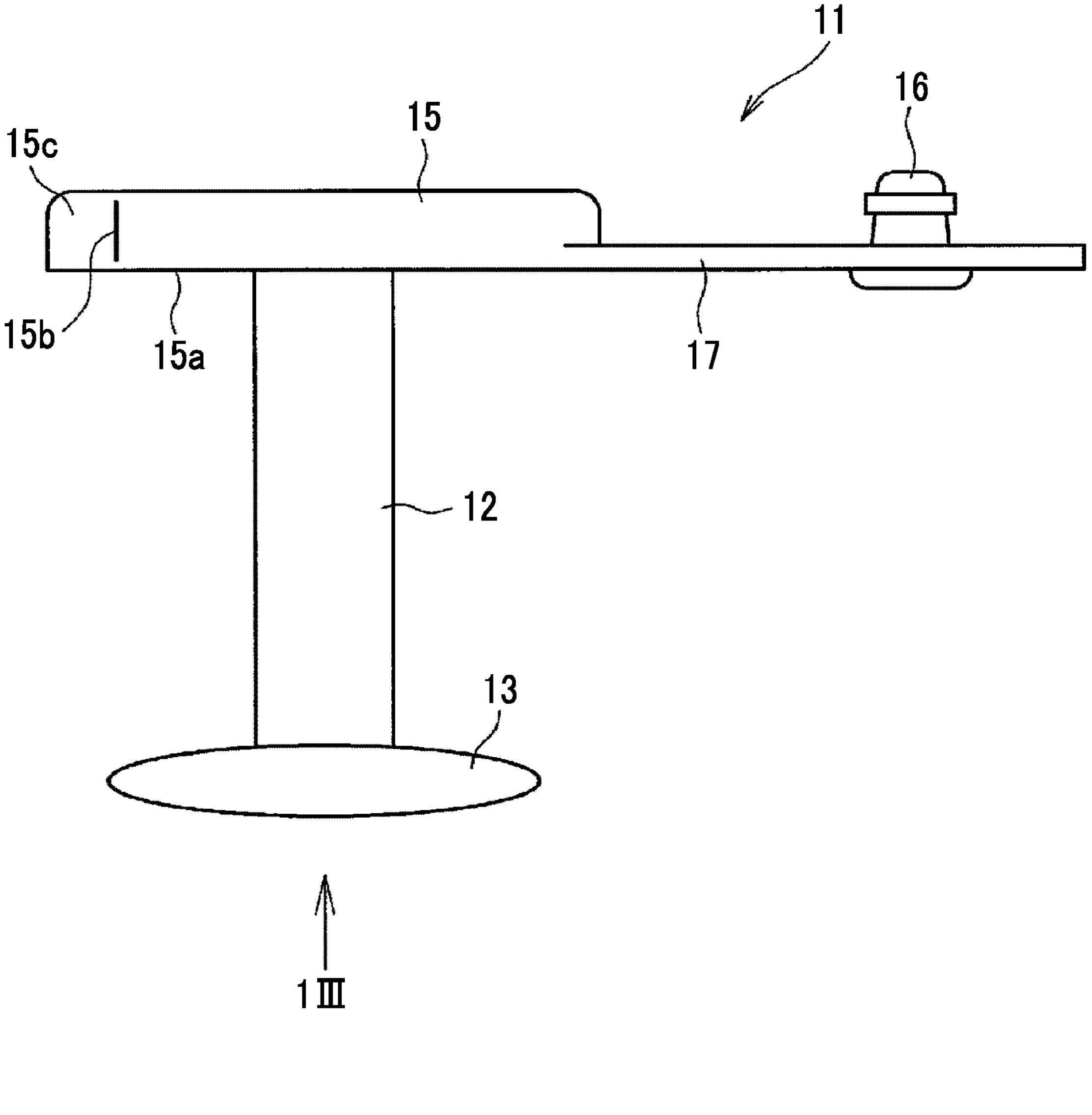
FIG. 1 is a front view of a gastrostomy catheter according to the present embodiment.

Hereinafter, an embodiment of the present invention will be described with reference to the drawings.

The embodiment described below is merely an example for facilitating the understanding of the present invention, and does not limit the present invention. That is, a shape, dimension, arrangement, or the like of a member described below can be modified and improved within a scope which does not depart from the gist of the present invention, and the present invention includes equivalents thereof.

Moreover, in all the drawings, the same reference numerals are assigned to the same components, and repeated descriptions thereof will be appropriately omitted.

<<Overview>>

Figure 2:
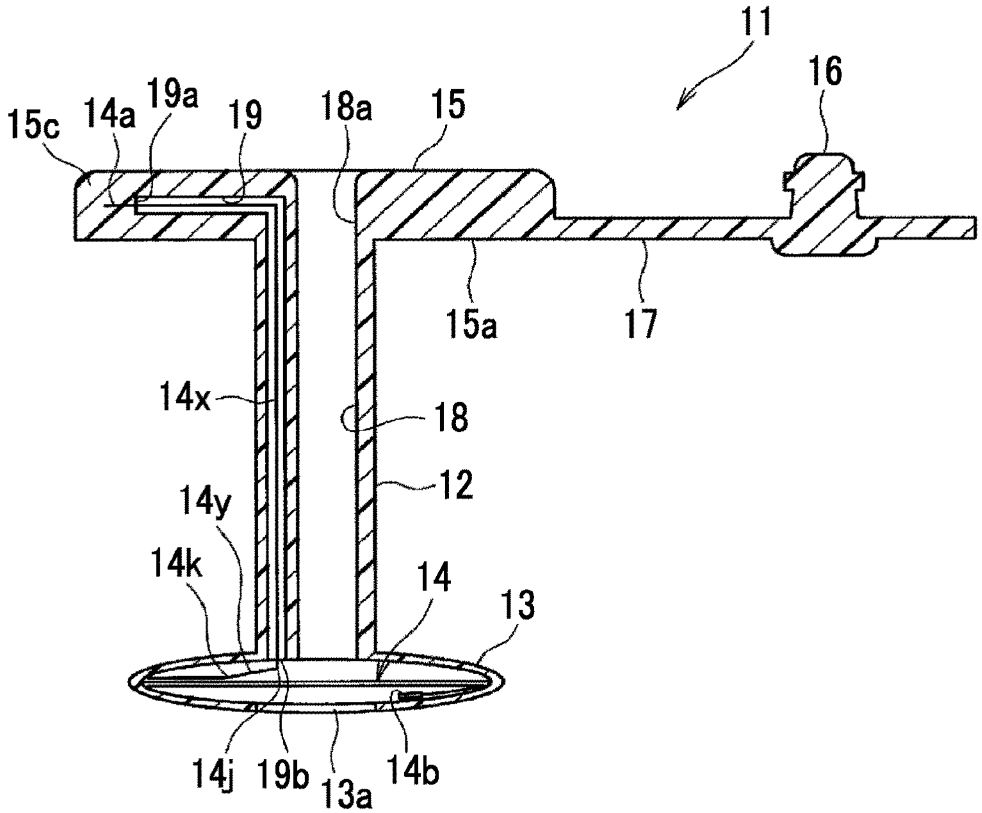
FIG. 2 is a front cross-sectional view of the gastrostomy catheter.

First, an overview of a gastrostomy catheter 11 according to the present embodiment will be described mainly with reference to FIGS. 1 and 2. FIG. 1 is a front view of the gastrostomy catheter 11 according to the present embodiment, and FIG. 2 is a front cross-sectional view of the gastrostomy catheter 11.

In the present specification, a "distal side" refers to a side of the gastrostomy catheter 11 far from an operator of the gastrostomy catheter 11 unless otherwise specified, and specifically, refers to a side on which a bumper 13 is provided. Further, the distal side may be referred to as a tip side.

Moreover, a "proximal side" refers to a side of the gastrostomy catheter 11 close to the operator unless otherwise specified. In addition, the proximal side may be referred to as a base end side.

The gastrostomy catheter 11 includes a shaft 12 in which a lumen is provided, a flexible bumper 13 which is provided at a tip of the shaft 12, and a linear member (wire 14) which has elasticity and can bias the bumper 13 in a diameter-increasing direction or can restrict deformation of the bumper 13 in a diameter-decreasing direction.

Here, "the bumper 13 can be biased in the diameter-increasing direction" means that the wire 14 is elastically deformed and comes into contact with the bumper 13 in a radial direction, and thus, it is possible to apply a restoring force in the diameter-increasing direction of the bumper 13.

Further, "the deformation of the bumper 13 in the diameter-decreasing direction can be restricted" means that when the bumper 13 abuts on an edge surface of a stomach wall and a diameter of the bumper 13 decreases, the wire 14 abuts on the bumper 13, and thus, the deformation of the bumper 13 in the diameter-decreasing direction can be restricted. That is, the wire 14 is not limited to a wire which constantly biases the bumper 13 in the diameter-increasing direction, and the wire 14 may be biased in the diameter-increasing direction for the first time when an external force is applied to the bumper 13.

Moreover, in the present embodiment, the restoring force of the wire 14 is applied to the bumper 13 from the inside in the diameter-increasing direction. However, for example, the restoring force in the diameter-increasing direction may be applied from a linear member (no illustrated) disposed outside the bumper 13.

The gastrostomy catheter 11 includes the wire 14 which can bias the bumper 13 in the diameter-increasing direction or restrict the deformation of the bumper 13 in the diameter-decreasing direction. Accordingly, as compared with a gastrostomy catheter 11 which does not have the wire 14, it is possible to employ a material having flexibility for the bumper 13.

Accordingly, a resistance applied to a body when the gastrostomy catheter 11 is inserted or removed can be suppressed low. In addition, the gastrostomy catheter 11 including the bumper 13 and the wire 14 does not use a fluid unlike the gastrostomy catheter including a balloon. Accordingly, there is no need to replace the fluid. Therefore, as compared with a case where a balloon is used, time and effort required for management can be reduced, and the gastrostomy catheter 11 can be placed for a relatively long time.

<<Structure of Gastrostomy Catheter>>

Figure 3:
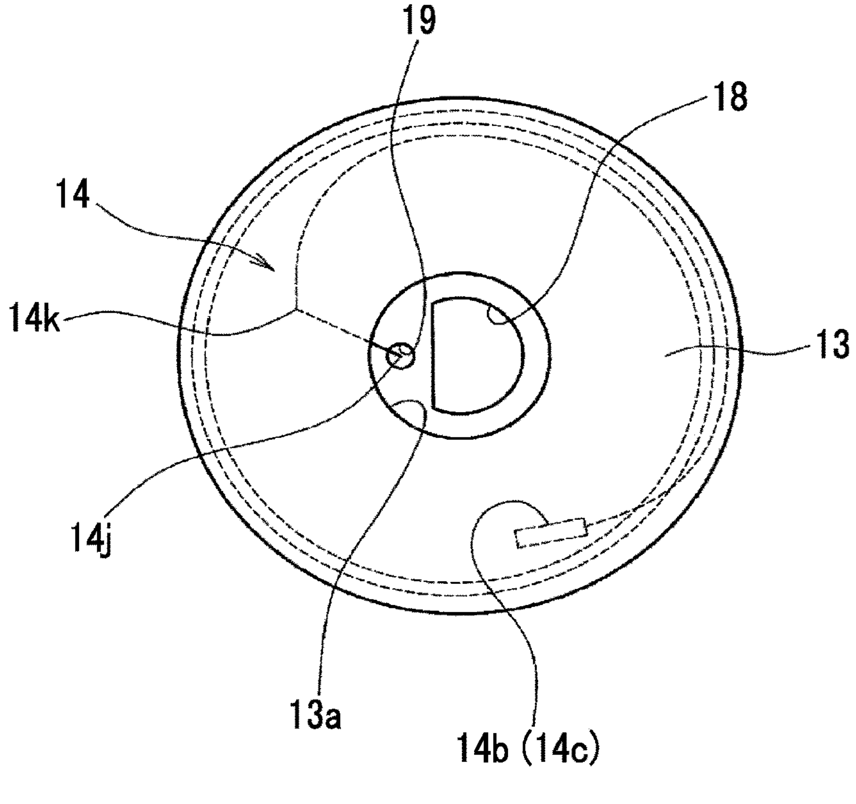
FIG. 3 is a bottom view of a bumper when viewed in a direction of an arrow 1III in FIG. 1.
Figure 4:
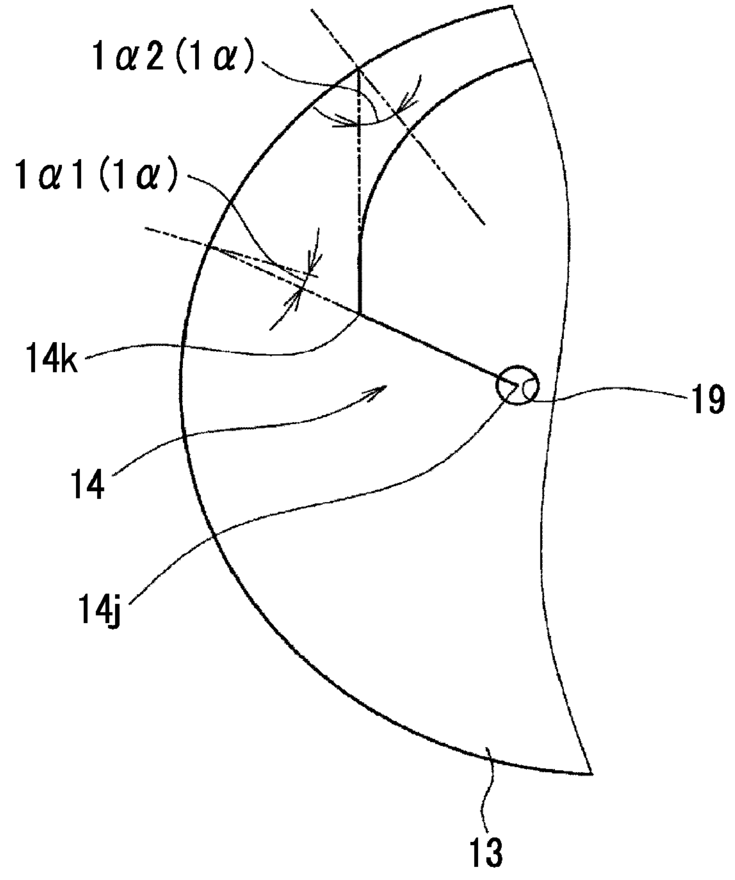
FIG. 4 is an explanatory view for explaining an angle of each site of a wire with respect to an inner peripheral surface of the bumper.
Figure 5:
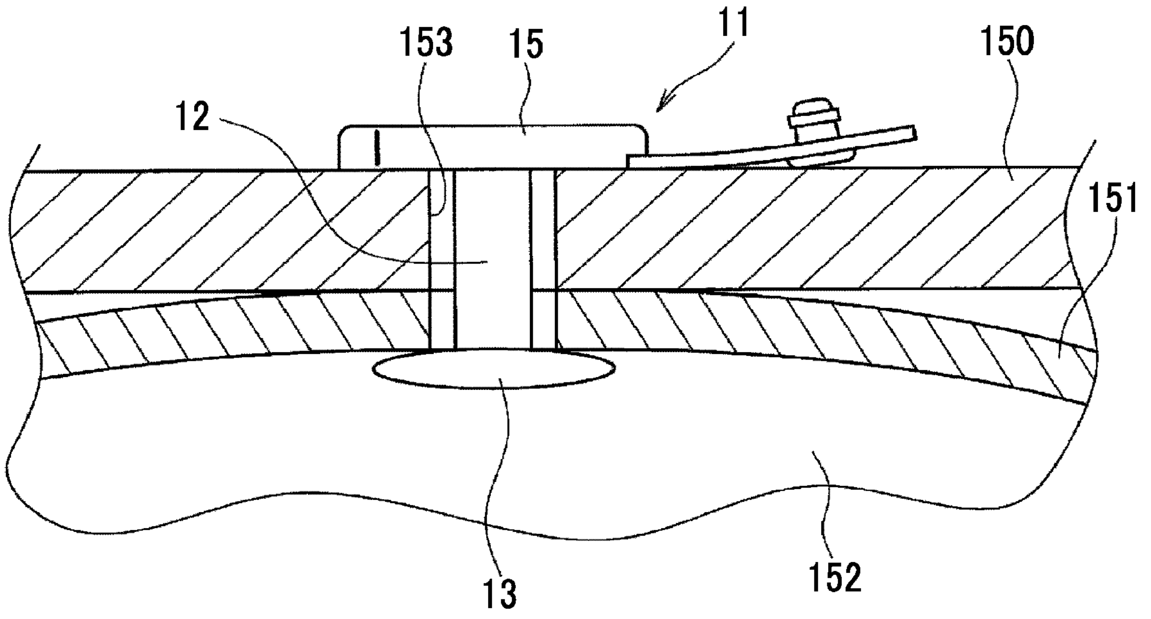
FIG. 5 is a schematic explanatory view illustrating a state of the gastrostomy catheter in which the bumper is placed in a stomach.

Next, details of a structure of the gastrostomy catheter 11 will be described mainly with reference to FIGS. 3 to 5 in addition to FIGS. 1 and 2. FIG. 3 is a bottom view of the bumper 13 when viewed in a direction of an arrow 1III in FIG. 1, FIG. 4 is an explanatory view for explaining an angle of each site of a wire 14 with respect to an inner peripheral surface of the bumper 13. FIG. 5 is a schematic explanatory view illustrating a state of the gastrostomy catheter 11 in which the bumper 13 is placed in a stomach 152.

The gastrostomy catheter 11 mainly includes the shaft 12, a fixing portion (extracorporeal fixing unit 15) which is provided in a base end portion of the shaft 12, the bumper 13 which is provided on a tip side of the gastrostomy catheter 11, and the wire 14 which is disposed over the inside of each of the extracorporeal fixing unit 15, the shaft 12, and the bumper 13.

The gastrostomy catheter 11 according to the present embodiment, except for the wire 14, is integrally formed of silicone rubber or urethane rubber. However, the present invention is not limited to this configuration and a separate component may be joined to constitute the gastrostomy catheter 11. In particular, even in a configuration in which a separate component is joined to constitute the gastrostomy catheter 11, the same kind of material is preferable in terms of quality.

The extracorporeal fixing unit 15 and the shaft 12 include the lumen. The lumen includes a main lumen 18 for injecting a nutrient and a sub-lumen 19 which accommodates at least a portion (base end side) of the wire 14.

The main lumen 18 communicates with a hollow space of the bumper 13 and a communication hole 13*a* to be described later which is formed in the bumper 13 and forms a flow path which penetrates from the base end portion to the tip portion in the gastrostomy catheter 11. Accordingly, the nutrient can be injected into the stomach 152 from outside the body. The main lumen 18 is formed in a D-shaped cross section in the present embodiment, and linearly extends along an axial direction of the shaft 12 at centers of the shaft 12 and the extracorporeal fixing unit 15.

In the hollow bumper 13, a communication hole 13*a* which is a circular hole is formed at an end to which the main lumen 18 extends. The communication hole 13*a* is formed to have a large diameter so as to expose the main lumen 18 and the sub-lumen 19 and include the main lumen 18 and the sub-lumen 19 inside when viewed from a bottom of the bumper 13.

The nutrient supplied into the stomach 152 (refer to FIG. 5) via the gastrostomy catheter 11 passes through the extracorporeal fixing unit 15 and the main lumen 18 of the shaft 12 and is supplied into the stomach 152 through the communication hole 13*a* of the bumper 13. A check valve for preventing backflow of a content such as gastric juice from the inside of the stomach 152 to the outside of the body is provided in the main lumen 18. However, in a state in which the check valve is omitted, FIG. 2 or the like is illustrated.

The sub-lumen 19 is formed on an outer peripheral side of the main lumen 18. The main lumen 18 is formed in a D-shaped cross section in a site passing through the shaft 12. Accordingly, the sub-lumen 19 is formed through a site formed thicker than other sites. The sub-lumen 19 is formed in a circular cross section and is bent in an L shape along the shaft 12 and the extracorporeal fixing unit 15. Specifically, the sub-lumen 19 linearly extends along the axial direction in the shaft 12, is bent at a right angle at a site reaching the extracorporeal fixing unit 15, and linearly extends along the extension direction of the extracorporeal fixing unit 15. Since a portion of the wire 14 is accommodated in the sub-lumen 19, the injection of the nutrient through the main lumen 18 side is not hindered. Further, the wire 14 can be protected in the sub-lumen 19.

In the sub-lumen 19, a tip opening portion 19*b*, which is a distal end portion having a certain length, extends linearly from the proximal side to the distal side and is continuous with the inside of the bumper 13. Here, that the tip opening portion 19*b* of the sub-lumen 19 is continuous with the inside of the bumper 13 means that the tip opening portion 19*b* of the sub-lumen 19 is provided in a space continuous with a space inside the bumper 13. In this way, the sub-lumen 19 is formed and a base end side of the wire 14 is disposed in the sub-lumen 19. Accordingly, a tip side of the wire 14 can be guided into the bumper 13.

The extracorporeal fixing unit 15 abuts on an abdominal wall 150, and thus, fixes (restricts a movement to a predetermined position) the gastrostomy catheter 11 outside the body so that the gastrostomy catheter 11 is not embedded in a fistula 153. The extracorporeal fixing unit 15 is formed larger than the shaft 12 in at least one direction perpendicular to the axial direction of the shaft 12 passing through the fistula 153. The extracorporeal fixing unit 15 in the present embodiment has a small piece shape which extends linearly perpendicular to an axis of the shaft 12. As illustrated in FIG. 5, the fistula 153 is formed to penetrate the abdominal wall 150 and the stomach wall 151.

The extracorporeal fixing unit 15 according to the present embodiment is formed integrally with the shaft 12 and the bumper 13. In the extracorporeal fixing unit 15, an opening 18*a*, which is a central portion of the shaft 12 in a radial direction and is a proximal opening of the main lumen 18 formed in the axial direction, is formed. Moreover, a strap 17 extends integrally from a side surface of the extracorporeal fixing unit 15, and a cap 16 capable of sealing the opening 18*a* is formed at a tip portion of the strap 17.

The extracorporeal fixing unit 15 includes a base end holding portion 15*c* described later which holds a base end portion 14*a* of the wire 14.

The base end portion 14*a* of the wire 14 is embedded in the base end holding portion 15*c*, and thus, the base end holding portion 15*c* holds the base end portion 14*a*. In order to easily pull out the wire 14 from other sites in the gastrostomy catheter 11, the base end holding portion 15*c* is provided in the extracorporeal fixing unit 15 so as to be cuttable. A configuration of the base end holding portion 15*c* which holds the base end portion 14*a* of the wire 14 is not limited to the configuration in which the base end portion 14*a* is embedded to hold the wire 14. For example, in order to hold the wire 14, a stopper or the like may be provided at the base end of the wire 14 so that a portion of the extracorporeal fixing unit 15 is locked to the stopper, or the base end portion 14*a* of the wire 14 may be interposed therebetween by a portion of the extracorporeal fixing unit 15.

In particular, a linear marker 15*b* serving as a guide for a cutout portion is provided on a side surface of the extracorporeal fixing unit 15 according to the present embodiment. The marker 15*b* is attached to a position included in an imaginary plane (vertical surface in the present embodiment) intersecting a base end portion 19*a* of the sub-lumen 19, which is a position where the base end holding portion 15*c* can be reliably cut off. Here, the base end portion 19*a* does not mean a base end surface, but means a site having a certain length at the base end.

The position at which the marker 15*b* is attached may be an upper surface (proximal end surface) of the extracorporeal fixing unit 15. Moreover, the marker 15*b* may be formed of a paint, or may be simply a groove-shaped cut. Further, as long as the positions of the wire 14 and the sub-lumen 19 can be visually recognized, the marker 15*b* is not necessarily an essential component.

The base end holding portion 15*c* is provided in this manner, and thus, the wire 14 can be placed at a predetermined position at which the tip portion of the wire 14 is located in the bumper 13.

For example, in the gastrostomy catheter 11 according to the present embodiment, a site disposed outside the body may be a so-called button type or a tube type. If there are other sites disposed outside the body, such as in a case of the tube type, the configuration of the gastrostomy catheter is not limited to a configuration in which the base end holding portion 15*c* is provided in the extracorporeal fixing unit 15, and it is sufficient if there is a site which holds the base end portion 14*a* of the wire 14 on a proximal side from the distal end 15*a* of the extracorporeal fixing unit 15.

If the base end holding portion 15*c* is not cut off, as in the base end holding portion 15*c* according to the above-described configuration, the wire 14 is prevented from coming off from the extracorporeal fixing unit 15 or the like. Accordingly, it is possible to prevent a patient from unexpectedly removing the wire 14.

The bumper 13 is formed integrally with the shaft 12 and is formed in a hollow disk shape. The shape of the bumper 13 in the present embodiment is the same (including substantially the same) disk shape in appearance in a natural state and a state in which the tip side of the wire 14 is accommodated. However, the bumper 13 is not limited to this shape, and may have flexibility such that the bumper 13 expands radially outward only when the tip side of the wire 14 is accommodated.

Moreover, the bumper 13 is formed to have a thickness thinner than a thickness (strictly speaking, a distance between a wall surface of the main lumen 18 and an outer surface of the shaft 12 at a site where the sub-lumen 19 is not formed) of the shaft 12 so as to have a predetermined flexibility. In this way, since the bumper 13 is thinner than the shaft 12, the bumper 13 can be easily expanded and shrunk.

As described above, the communication hole 13*a* which allows the inside and the outside of the bumper 13 to communicate with each other is formed on an extension side of the main lumen 18 on the distal side of the bumper 13.

In the bumper 13, the tip side of the wire 14 formed of a super-elastic alloy is disposed so as to be coiled. Accordingly, the bumper 13 is biased radially outward and a disk-shaped shape (including a shape of which a diameter is slightly reduced in the radial direction) is maintained in the stomach 152. The present invention is not limited to the configuration in which the wire 14 constantly biases the bumper 13 radially outward. That is, a configuration may be adopted in which the bumper 13 is biased radially outward when an external force is applied to the bumper 13 so that the bumper 13 is deformed in the diameter-decreasing direction and the bumper 13 abuts on the wire 14, and the deformation of the bumper 13 is restricted.

Furthermore, the present invention is not limited to the configuration in which the bumper 13 is formed in a disk shape in a natural state, and a configuration may be adopted in which the bumper 13 is formed in a disk shape for the first time when the tip side of the wire 14 is disposed in the bumper 13.

A portion on at least the tip side of the linear member (wire 14) is disposed in the bumper 13, and the linear member 14 is configured to be changed to a first state in which the linear member can bias the bumper 13 radially outward or can restrict the deformation of the bumper 13 in the diameter-decreasing direction, and a second state in which the linear member biases the bumper 13 radially outward lower than when the linear member is in the first state or does not bias the bumper 13, or the linear member allows the deformation of the bumper 13 in the diameter-decreasing direction more than when the linear member is in the first state. The second state is a state in which the wire 14 is disposed closer to the base end side of the bumper 13 or the wire 14 is pulled out closer to a proximal side from the bumper 13 than when the wire 14 is in the first state.

Specifically, when the wire 14 is completely pulled out from the bumper 13 (pulled out closer to the proximal side from the bumper 13), the wire 14 naturally does not bias the bumper 13 at all. Meanwhile, when the wire 14 is partially pulled out from the bumper 13, the bumper 13 is biased by a lower force than before the bumper 13 is pulled out, or the restricted deformation of the bumper 13 in the diameter-decreasing direction is allowed. The state of the bumper 13 relating to both of these is referred to as a "second state".

In this way, a state in which the wire 14 restricts the deformation of the bumper 13 can be changed depending on the position of the wire 14 with respect to the bumper 13.

The term "radially outward" means a direction having a radially outward component, and means all directions except a radially inward direction (in other words, a direction toward a center of the bumper 13). The same applies to the following.

As described above, the base end portion 14*a* of the wire 14 is embedded in the base end holding portion 15*c*. At least the tip portion 14*b* of the wire 14 is movably disposed in the bumper 13 without being supported by other members, and can be inserted into or drawn from the inside and outside (more specifically, the inside of the bumper 13 and a distal side outer portion of the bumper 13) of the bumper 13 via the communication hole 13*a*.

According to this configuration, it is possible to easily manufacture the gastrostomy catheter 11 which is disposed so that the tip portion 14*b* of the wire 14 is coiled in the bumper 13. Specifically, first, a manufacturer once puts out the tip portion 14*b* of the wire 14 passing through the sub-lumen 19 from the communication hole 13*a* to the outside of the bumper 13. Thereafter, a base end side rather than a tip side in the tip portion 14*b* of the wire 14 coming out from the bumper 13 is accommodated in the bumper 13 so as to be gradually coiled in the bumper 13, and thus, the wire 14 is disposed in the bumper 13 until the tip thereof is in the bumper 13. Accordingly, it possible to easily manufacture the gastrostomy catheter 11 having the wire 14 which is accommodated so that the tip side is coiled.

The above-described wire 14 is changed from the first state to be disposed on a proximal side in a direction pulled out from the bumper 13 to the second state, it is possible to weaken a biasing force to the bumper 13 or to allow the deformation of the bumper 13 in the diameter-decreasing direction. In this way, the wire 14 is set to the second state, and thus, a resistance applied to the body when the gastrostomy catheter 11 is removed can be suppressed low.

Moreover, in the present embodiment, as will be described later, the gastrostomy catheter 11 is inserted in a state in which the tip side of the wire 14 is accommodated in the bumper 13 and in a state in which the bumper 13 is folded by a capsule cover 110. For example, when inserting the gastrostomy catheter 11 without using the capsule cover 110, the wire 14 is pulled out from the bumper 13, and after the bumper 13 is in the second state, the gastrostomy catheter 11 may be inserted. In this case as well, the resistance applied to the body can be suppressed low.

The present invention is not limited to the configuration in which the tip side of the coiled wire 14 has a curvature to constantly bias an inner surface of the bumper 13. That is, the tip side of the coiled wire 14 may have a radius of curvature larger than an outer diameter of the shaft 12, and may be disposed to be separated from the inner surface of the bumper 13 as long as the deformation of the bumper 13 is suppressed so that the bumper 13 can be locked to an edge of the fistula 153 in the stomach 152.

In the above embodiment, the configuration in which the wire 14 is completely pulled out from the gastrostomy catheter 11 is described. However, the present invention is not limited to the configuration. For example, only a portion of the wire 14 may be pulled out from the bumper 13 to reduce an amount of a site of the wire 14 in the bumper 13. Even in this case, the radially outward biasing force of the bumper 13 is weakened or the force for restricting the deformation of the bumper 13 in the diameter-decreasing direction is weakened by an amount corresponding to the reduction in the amount of the wire 14. Accordingly, it is possible to suppress the resistance when the gastrostomy catheter 11 is inserted into or removed from the inside of the stomach 152. The configuration is preferable in that a load of the wire 14 acting on the bumper 13 can be easily adjusted.

However, the present invention is not limited to this configuration, and is not limited to a configuration in which the wire 14 is pulled out to the proximal side of the gastrostomy catheter 11 as long as the load of the wire 14 on the bumper 13 can be adjusted. For example, a rod for hooking the wire 14 may be inserted from the main lumen 18, and the wire 14 may be wound in the bumper 13 to reduce the diameter so that the radially outward load on the bumper 13 is reduced.

Further, at least the tip portion 14*b* of the wire 14 is covered with a coating portion 14*c* having a lower hardness than the wire 14, or is formed into a blunt (substantially spherical shape) shape by electric discharge machining.

At least the tip portion 14*b* of the wire 14 is covered with a coating portion 14*c*, or is formed into a blunt (substantially spherical shape) shape by electric discharge machining According to this configuration, it is possible to prevent the tip portion 14_b_ from damaging the bumper 13 when the tip portion 14_b_ of the wire 14 is accommodated in the bumper 13.

In a state in which the wire 14 is disposed over the sub-lumen 19 and the bumper 13, as illustrated in FIG. 2, a first site 14_x_ of the wire 14 disposed in the sub-lumen 19 and a second site 14_y_ disposed in the bumper 13 are bent at the bending point 14_j_ and are formed continuously. In other words, the wire 14 is bent in the bumper 13 outward at the bending point 14_j_ in the radial direction of the bumper 13.

As described above, since the wire 14 is bent, it is easy to smoothly bias the bumper 13 in the diameter-increasing direction or to uniformly restrict the deformation of the bumper 13 in the diameter-decreasing direction at the end of the wire 14 inserted into the sub-lumen 19. Accordingly, it is possible to suitably maintain a state in which the bumper 13 is biased in the diameter-increasing direction and a state in which the deformation of the bumper 13 in the diameter-decreasing direction is restricted. 153, and it is possible to prevent the bumper 13 and the gastrostomy catheter 11 from being unexpectedly pulled out from the fistula 153.

Further, in the state in which the wire 14 is disposed over the sub-lumen 19 and the bumper 13, at least a portion of the site of the wire 14 disposed in the bumper 13 is formed so as to be bent at a bending point 14_k_ to extend in a direction along an inner peripheral surface of the bumper 13.

Here, as illustrated in FIG. 4, when an angle between an extension line of a certain portion of the wire 14 and a normal line to the inner peripheral surface of the bumper 13 is represented by an incident angle 1α, the angle of incidence with respect to an extension line from the bending point 14_j_ toward the inner peripheral surface of the bumper 13 is defined 1α1, and the angle of incidence with respect to the extension line from the bending point 14_k_ toward the inner peripheral surface of the bumper 13 is defined as 1α2. In this case, that the wire 14 is bent so as to extend in the direction along the inner peripheral surface of the bumper 13 means that the wire 14 is bent so that the incident angle 1α2 is larger than the incident angle 1α1.

Since the wire 14 is formed to be bent in the direction along the inner peripheral surface of the bumper 13, the wire 14 can be led along the inner peripheral surface of the bumper 13, and at each position in a circumferential direction of the bumper 13, it is easy to uniformly apply a load which biases the bumper 13 in the diameter-increasing direction or a load which restricts the deformation of the bumper 13.

<<Method of Attaching Gastrostomy Catheter>>

Figure 6:
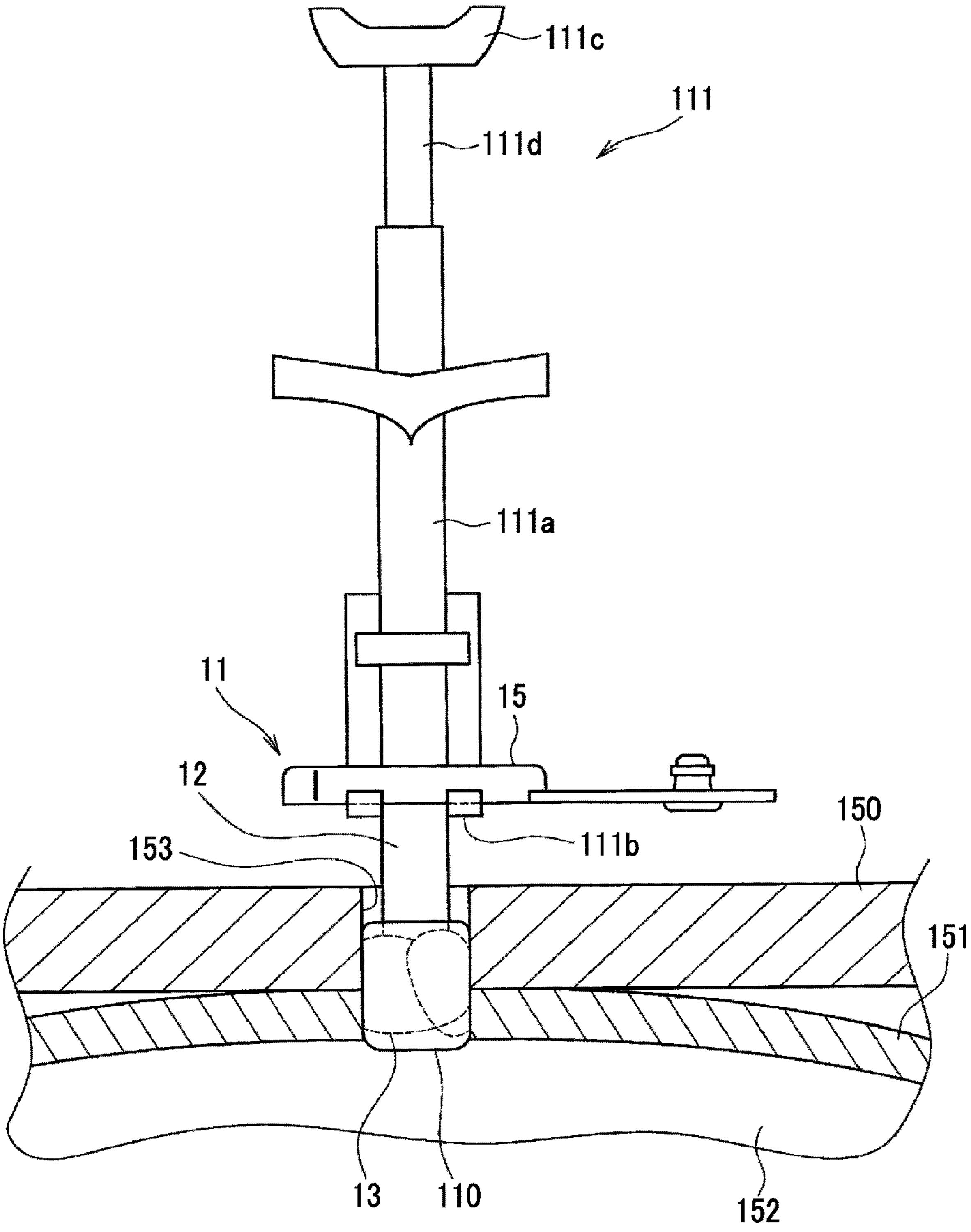
FIG. 6 is a schematic explanatory view illustrating a state in which the gastrostomy catheter is inserted into the stomach through a fistula.
Figure 7:
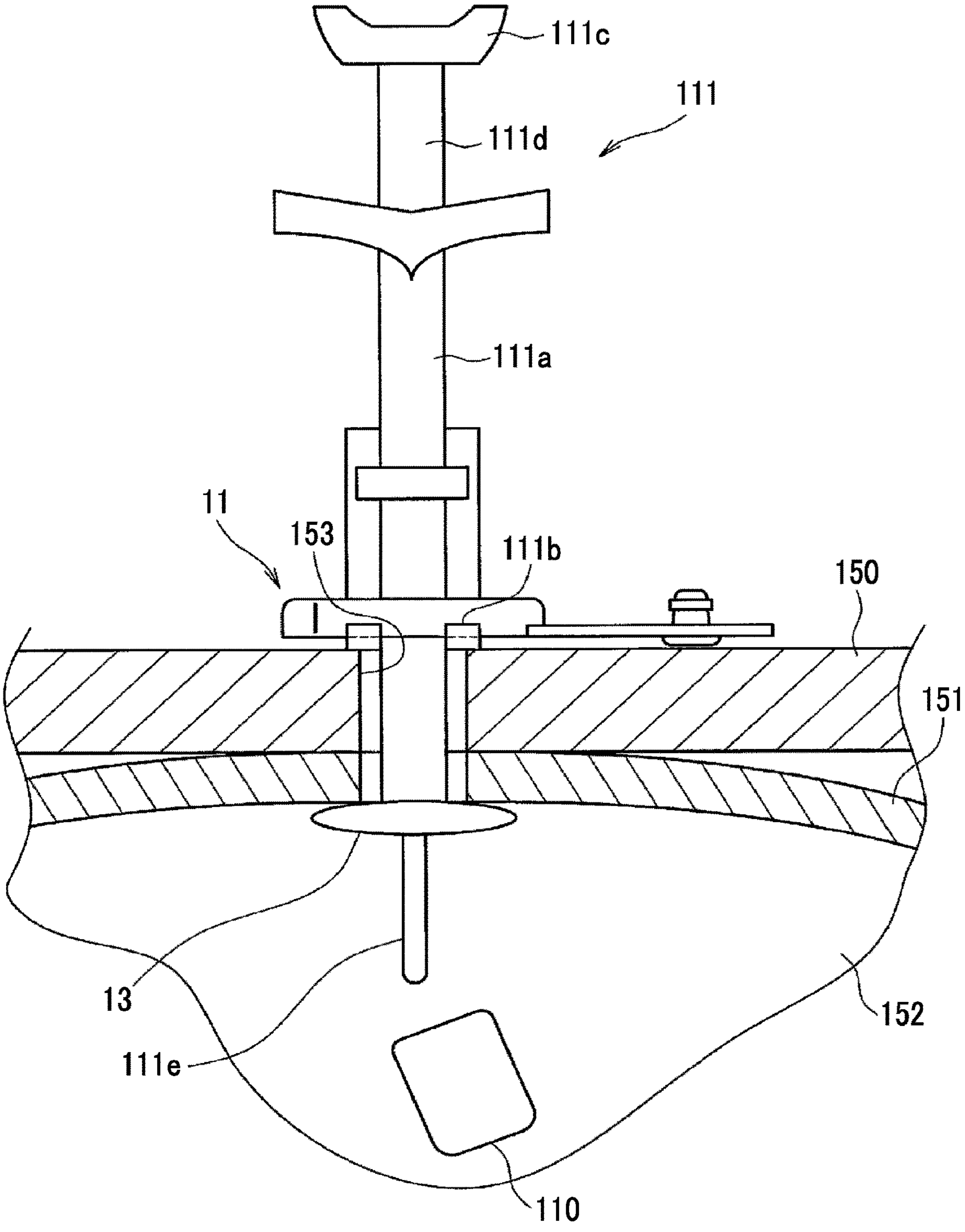
FIG. 7 is a schematic explanatory view illustrating a state in which a cover is removed from the gastrostomy catheter by an insertion jig and the bumper is expanded.

Next, a method of attaching the gastrostomy catheter 11 will be described with reference to FIGS. 6 and 7 in addition to FIG. 5. FIG. 6 is a schematic explanatory view illustrating a state in which the gastrostomy catheter 11 is inserted into the stomach 152 through the fistula 153, and FIG. 7 is a schematic explanatory view illustrating a state in which the capsule cover 110 is removed from the gastrostomy catheter 11 by an insertion jig 111 and the bumper 13 is expanded.

The gastrostomy catheter 11 includes the cover (capsule cover 110) which holds and accommodates the bumper 13 in a state in which the tip side of the wire 14 is disposed in the bumper 13 and is folded. Here, the capsule cover 110 can be directly or indirectly attached to the shaft 12 and may be any one as long as it holds the folded state of the bumper 13 and accommodates the bumper 13. In other words, the term “accommodation” includes accommodation of the entirety of the bumper 13 and accommodation of at least a portion of the bumper 13.

When the bumper 13 is disposed in the stomach 152 via the fistula 153, the capsule cover 110 suppresses the resistance applied to the wall surface of the fistula 153 while maintaining the folded state of the bumper 13 and facilitates insertion of the bumper 13 into the body.

The capsule cover 110 is a hard capsule cover used for food made of a cellulose-based material or a gelatin-based material, or is a material decomposed in the body such as polylactic acid, and is formed in a blunt cap shape in which one side has a bottom portion and the other side is an open end. The shape of the capsule cover 110 is not particularly limited, and may be a hemisphere or the like.

The surgeon removes the capsule cover 110 in the body, and thus, can increases the diameter of the bumper 13 by biasing of the wire 14 in the diameter-increasing direction. The insertion jig 111 is used to attach the gastrostomy catheter 11 to the fistula 153 and remove the capsule cover 110.

The insertion jig 111 includes a main body tube 111_a_, a pair of claws 111_b_ which is attached to the main body tube 111_a_, an operation unit 111_c_, a piston 111_d_ which is reciprocally movable with respect to the main body tube 111_a_, and an extrusion rod 111_e_ which is connected to the piston 111_d_ and protrudes/retreats in an axial direction.

When the gastrostomy catheter 11 is inserted into the fistula 153, the surgeon folds the bumper 13 and covers the folded bumper 13 with the capsule cover 110, and thus, maintains the folded state of the bumper 13.

Further, the surgeon grasps the insertion jig 111, supports a lower surface (distal surface) of the extracorporeal fixing unit 15 of the gastrostomy catheter 11 so that the shaft 12 is interposed between the pair of claws 111_b_, and maintains the insertion jig 111 as illustrated in FIG. 6.

Next, the surgeon causes the bumper 13 covered with the capsule cover 110 to pass through the fistula 153 together with the capsule cover 110, and pushes the gastrostomy catheter 11 in the stomach 152 by the insertion jig 111 to a position (a position where the claw 111_b_ abuts on a surface of the abdominal wall 150) at which the bumper 13 reaches the inside of the stomach 152.

Thereafter, as illustrated in FIG. 7, the surgeon operates to push the operation unit 111_c_ to the distal side and pushes the piston 111_d_ into the main body tube 111_a_ so that the extrusion rod 111_e_ protrudes. In this case, the extrusion rod 111_e_ pushes out only the capsule cover 110 through the communication hole 13_a_ of the bumper 13, and the capsule cover 110 falls out of the bumper 13, as illustrated in FIG. 7.

The diameter of the bumper 13 released from the holding from the capsule cover 110 increases to have a diameter larger than a diameter of the fistula 153 by the biasing force of the wire 14, and the bumper 13 is placed in the stomach 152.

Since the capsule cover 110 which has fallen into the stomach 152 is a material which is edible or decomposed in the body as described above, the capsule cover 110 is excreted or dissolved together with the content of the stomach and has no effect on the body.

<<Method of Removing Gastrostomy Catheter>>

Figure 8:
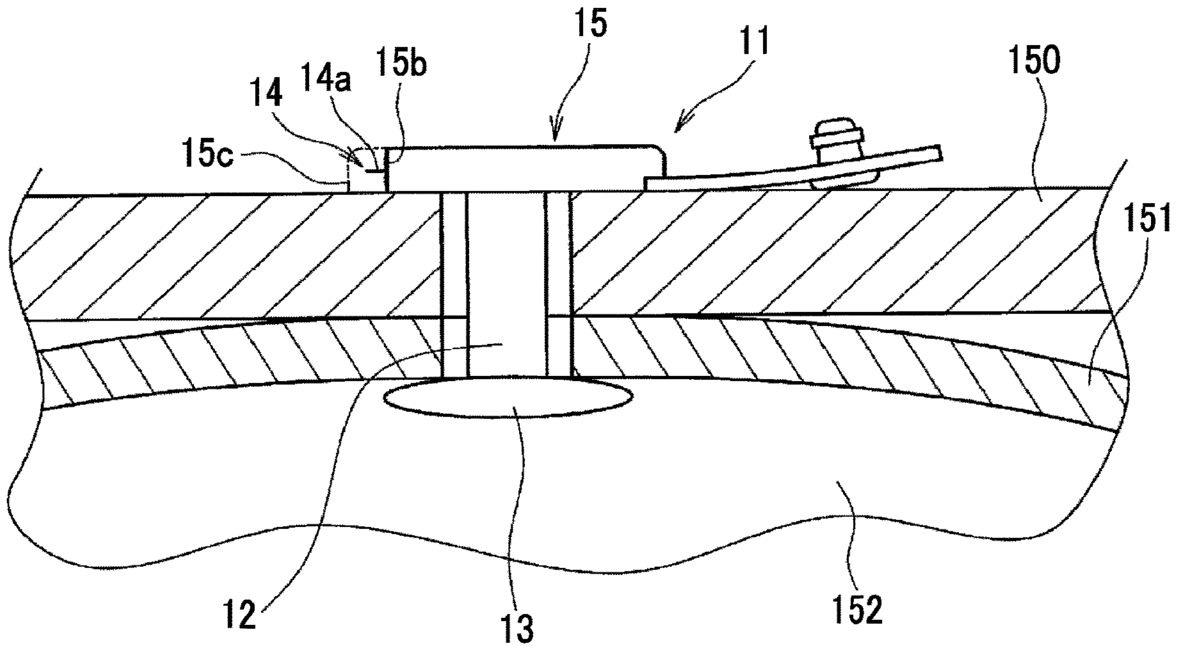
FIG. 8 is a schematic explanatory view illustrating a state of the gastrostomy catheter in a state in which a base end holding portion is removed from the extracorporeal fixing unit.
Figure 9:
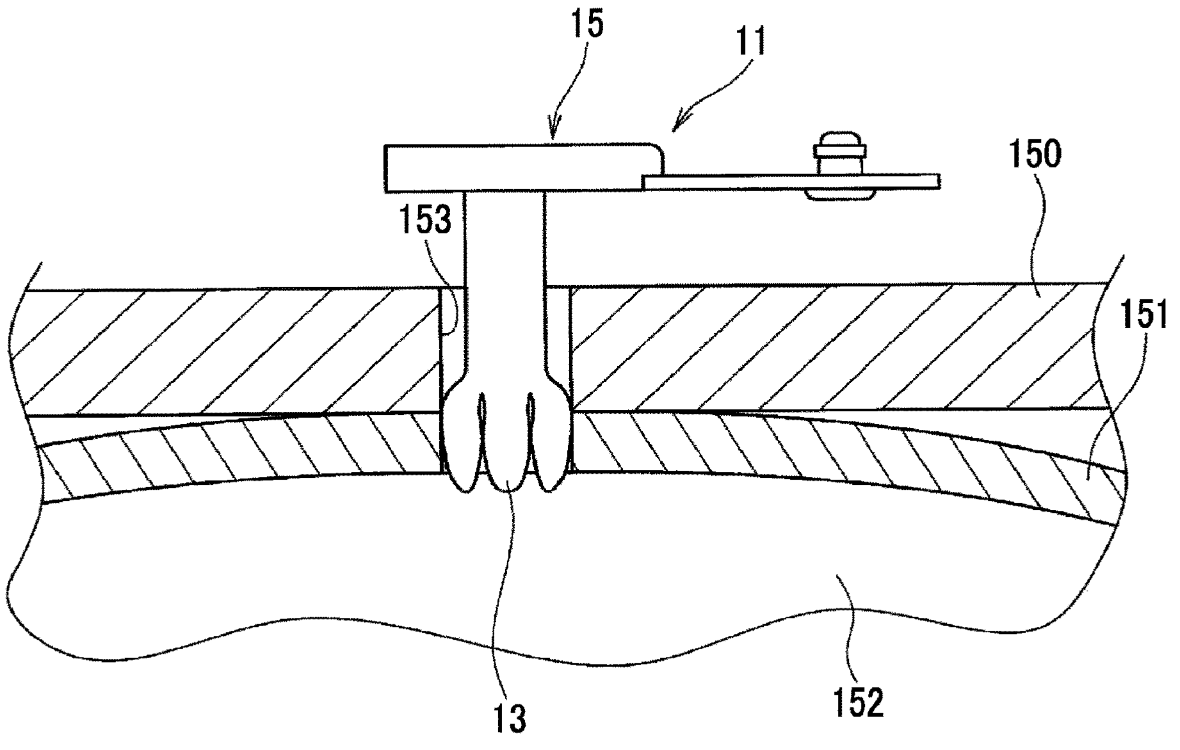
FIG. 9 is a schematic explanatory view illustrating a state in which the gastrostomy catheter is removed from an inside of the stomach.

The surgeon needs to replace the gastrostomy catheter 11 every predetermined period in order to suitably maintain a sanitary condition when the surgeon uses the gastrostomy catheter 11. A method of removing the existing gastrostomy catheter 11 required when the gastrostomy catheter 11 is replaced will be described with reference to FIGS. 8 and 9. FIG. 8 is a schematic explanatory view illustrating a state of the gastrostomy catheter 11 in a state in which the base end holding portion 15*c* is removed from the extracorporeal fixing unit 15. FIG. 9 is a schematic explanatory view illustrating a state in which the gastrostomy catheter 11 is removed from the inside of the stomach 152.

First, the surgeon removes the base end holding portion 15*c* of the extracorporeal fixing unit 15 from other sites of the extracorporeal fixing unit 15 using scissors or the like so that the base end holding portion 15*c* is cut along the marker 15*b*. In this case, the surgeon separates the base end holding portion 15*c* from other sites of the extracorporeal fixing unit 15 so as not to cut the wire 14. As described above, since the marker 15*b* is attached at the position included in the imaginary plane intersecting the base end portion 19*a* of the sub-lumen 19, by separating the base end holding portion 15*c* along the marker 15*b*, the embedded portion of the base end portion 14*a* of the wire 14 in the extracorporeal fixing unit 15 is eliminated.

The surgeon grasps the base end portion 14*a* and pulls out the wire 14 from the bumper 13, the shaft 12, and the extracorporeal fixing unit 15.

Finally, the surgeon grasps the extracorporeal fixing unit 15 and pulls the gastrostomy catheter 11 out of the body through the fistula 153. In this case, as illustrated in FIG. 9, the bumper 13 is in the second state due to the wire 14 being pulled out and the diameter of the bumper 13 decreases when the bumper 13 comes into contact with the wall surface of the fistula 153. Accordingly, the resistance to the body is suppressed low.

Modification Example 1-1

In the above embodiment, as illustrated in FIG. 2, the base end holding portion 15*c* for holding the base end portion 14*a* of the wire 14 is formed integrally with the extracorporeal fixing unit 15, the wire 14 is embedded to be held and is cut to release the holding of the wire 14. However, the present invention is not limited to this configuration.

Figure 10:
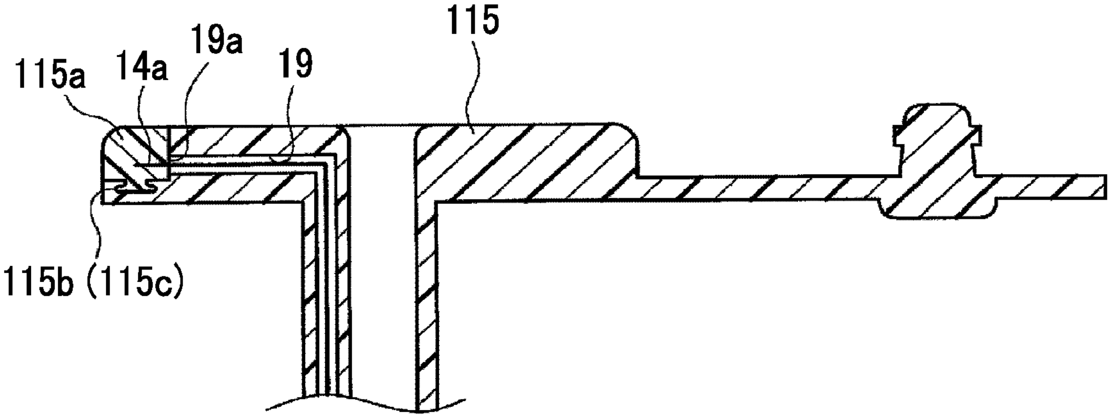
FIG. 10 is a front cross-sectional view illustrating an extracorporeal fixing unit according to Modification Example 1-1.

Next, an extracorporeal fixing unit 115 according to Modification Example 1-1 will be described with reference to FIG. 10. FIG. 10 is a front cross-sectional view illustrating an extracorporeal fixing unit 115 according to Modification Example 1-1.

The base end holding portion 115*a* which holds the base end portion 14*a* of the wire 14 is separate from the fixing portion (extracorporeal fixing unit 115) and is detachably attached to the fixing portion (extracorporeal fixing unit 115).

Specifically, the base end holding portion 115*a* is disposed on an extension of the base end portion 19*a* of the sub-lumen 19, has a small-diameter neck portion and a large-diameter head portion, and has a locking protrusion 115*b* protruding downward (distal side) at a lower portion thereof. A concave groove 115*c* having a shape relative to the locking protrusion 115*b* is formed in a site of the extracorporeal fixing unit 115 facing the locking protrusion 115*b*.

The locking protrusion 115*b* is accommodated in the groove 115*c* to be locked by an opening forming the concave groove 115*c* being expanded so as to be elastically deformed.

According to this configuration, a state in which the tip portion of the wire 14 is disposed in the bumper 13 can be maintained by attaching the base end holding portion 115*a* to the extracorporeal fixing unit 115. In addition, by releasing the locking of the locking protrusion 115*b* into the concave groove 115*c* and removing the base end holding portion 115*a* from the extracorporeal fixing unit 115, the wire 14 together with the base end holding portion 115*a* can be removed from the shaft 12, the bumper 13, and the extracorporeal fixing unit 115.

The locking protrusion 115*b* may be made of a resin rubber harder than the concave groove 115*c*. According to this configuration, the locking protrusion 115*b* is easily fitted into the relatively soft concave groove 115*c*. A configuration in which a concave groove is provided on the base end holding portion 115*a* side and a locking protrusion is provided on the extracorporeal fixing unit 115 side may be adopted.

In order to prevent the patient from accidentally detaching the base end holding portion 115*a* from the extracorporeal fixing unit 115, a clip (not illustrated) or the like which is interposed between the base end holding portion 115*a* and the extracorporeal fixing unit 115 may be further provided.

Modification Example 1-2

In the above embodiment, as illustrated in FIG. 3, the configuration is described, in which the communication hole 13*a* is formed in the bumper 13 to have a large diameter so as to expose the main lumen 18 and the sub-lumen 19. However, the present invention is not limited to this configuration.

Figure 11:
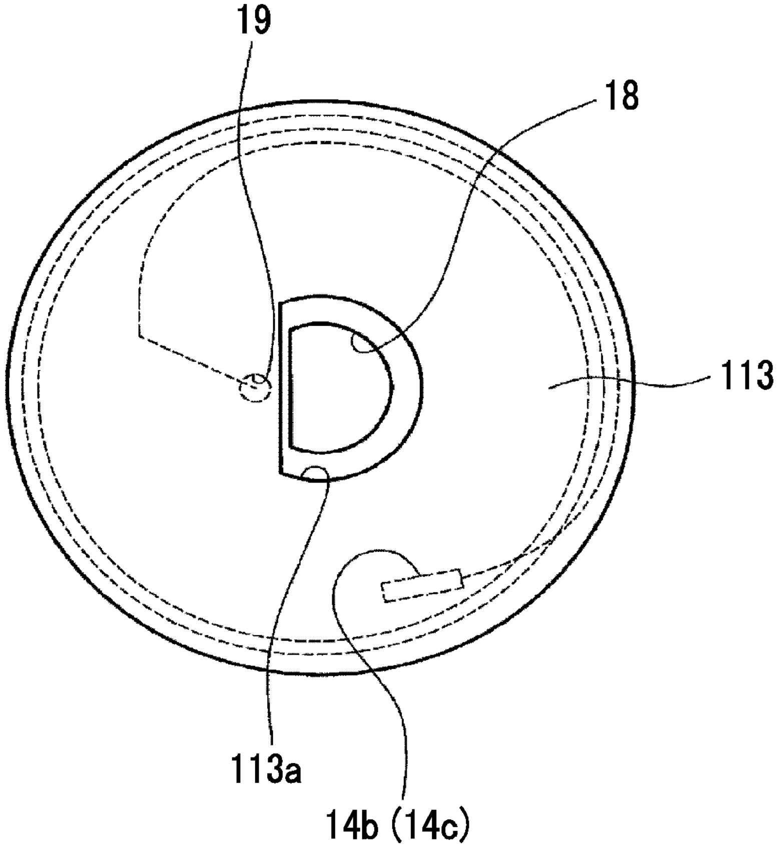
FIG. 11 is a bottom view illustrating a communication hole of the bumper according to Modification Example 1-2.

Next, a bumper 113 according to Modification Example 1-2 will be described with reference to FIG. 11. FIG. 11 is a bottom view illustrating a communication hole 113*a* of the bumper 113 according to Modification Example 1-2.

A portion of an inner wall of the bumper 113 according to the Modification Example 1-2 is located on the extension of the sub-lumen 19. Specifically, the communication hole 113*a* in the present example is formed in a D-shaped cross section so as not to expose the sub-lumen 19 while exposing the main lumen 18 with an edge when viewed from the bottom.

According to this configuration, when the wire 14 is inserted into the sub-lumen 19 and the tip portion 14*b* is disposed in the bumper 113, the tip portion 14*b* abuts on a portion of the inner wall of the bumper 113. Therefore, the tip side of the wire 14 is naturally disposed in the radial direction of the bumper 113.

In particular, in a second state in which the tip side of the wire 14 is not disposed in the bumper 113, the bumper 113 can be disposed in the stomach 152 through the fistula 153 while suppressing the resistance applied to the body.

Thereafter, the tip side of the wire 14 having the base end portion 14*a* embedded in the base end holding portion 115*a* illustrated in FIG. 10 is fed through the sub-lumen 19 so as to be coiled in the bumper 113. Accordingly, the state in which the bumper 113 can be biased in the diameter-increasing direction or the state in which the deformation of the bumper 113 in the diameter-decreasing direction can be restricted can be easily achieved. Therefore, the bumper 113 can be brought into the first state by a simple method of inserting the wire 14 into the sub-lumen 19, instead of a method of expanding the diameter of the bumper 13 by removing the capsule cover 110 by the insertion jig 111.

The configuration is described in which the main lumen 18 in the above embodiment and the present example has a D-shaped cross section. However, as long as a thickness for forming the sub-lumen 19 can be secured in the shaft 12, the main lumen 18 may have a circular cross-section or a rectangular cross and is not limited to such a shape. Accordingly, as long as a portion of the inner wall of the bumper 113 can be located on the extension of the sub-lumen 19, the shape of the communication hole 113*a* may be a circular cross section or rectangular cross section and is not limited to such a shape.

Modification Example 1-3

In the above embodiment, as illustrated in FIG. 2, the configuration is described in which the tip opening portion 19*b* of the sub-lumen 19 extends linearly from the proximal side to the distal side and is continuous into the bumper 13. However, the present invention is not limited to this configuration.

Figure 12:
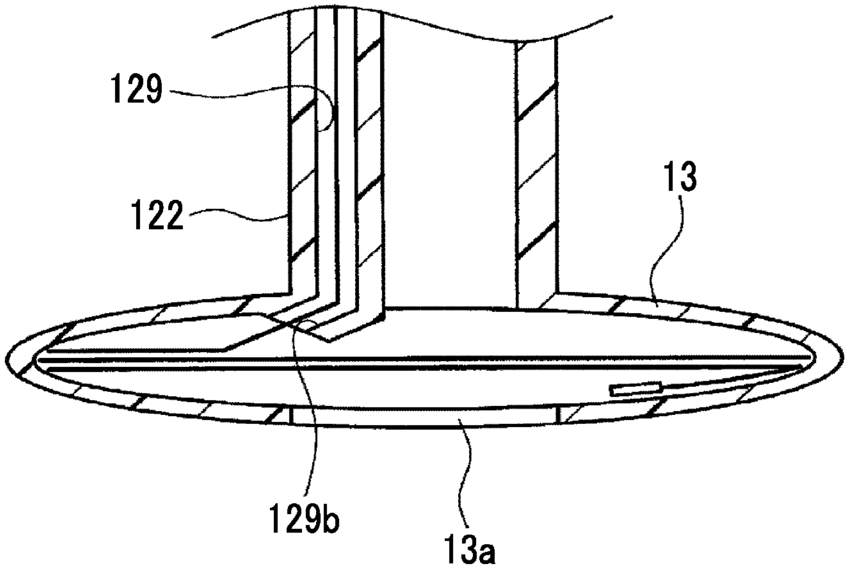
FIG. 12 is a front cross-sectional view illustrating a tip portion of a sub-lumen according to Modification Example 1-3.

Next, a sub-lumen 129 according to Modification Example 1-3 will be described with reference to FIG. 12. FIG. 12 is a front cross-sectional view illustrating a tip opening portion 129*b* of the sub-lumen 129 according to Modification Example 1-3.

A tip portion (the tip opening portion 129*b*) of the sub-lumen 129 passing through a shaft 122 according to Modification Example 1-3 is formed to be bent radially outward of the bumper 13. Specifically, the tip opening portion 129*b* extends to the inside of the bumper 13, and a wall portion defining the tip opening portion 129*b* is bent and extends radially outward of the bumper 13 in the bumper 13.

According to this configuration, when the wire 14 is inserted into the sub-lumen 129 and the tip portion 14*b* is disposed in the bumper 13, the tip portion 14*b* is guided radially outward of the bumper 13 by the tip opening portion 129*b* of the sub-lumen 129. Therefore, the tip side of the wire 14 is naturally disposed radially outward of the bumper 13.

In particular, similar to the Modification Example 1-2, the tip side of the wire 14 is brought into the second state in which the tip side is not disposed in the bumper 13, and thus, the bumper 13 can be disposed in the stomach 152 through the fistula 153 and the stomach 152 is inserted while the resistance applied to the body is suppressed.

Thereafter, the tip side of the wire 14 having the base end portion 14*a* embedded in the base end holding portion 115*a* illustrated in FIG. 10 is fed through the sub-lumen 129 so as to be coiled in the bumper 13. Accordingly, the first state (that is, the state in which the bumper 13 can be biased in the diameter-increasing direction or the state in which the deformation of the bumper 113 in the diameter-decreasing direction can be suppressed) can be easily achieved. Therefore, the bumper 13 can be brought into the first state by a simple method of inserting the wire 14 into the sub-lumen 19, instead of expanding the bumper 13 by removing the capsule cover 110 by the insertion jig 111.

Modification Example 1-4

The configuration is described in which each of the bumpers 13 and 113 according to the above embodiment is formed in a hollow disk shape. However, the present invention is not limited to this configuration.

Figure 13:
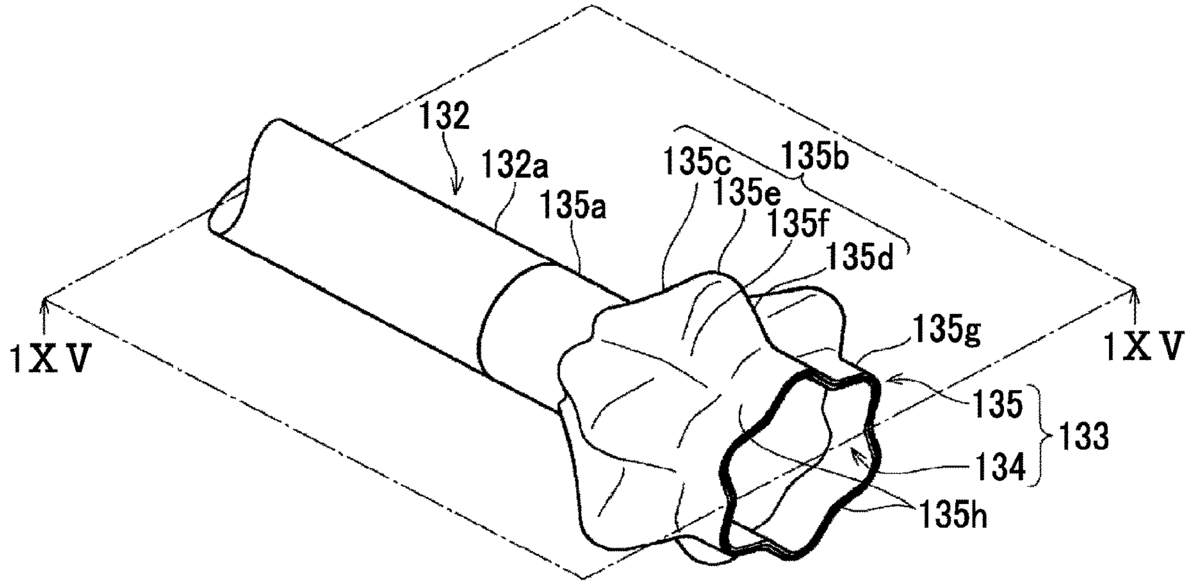
FIG. 13 is a perspective view illustrating a bumper and a shaft to which the bumper is attached according to a Modification Example 1-4.
Figure 14:
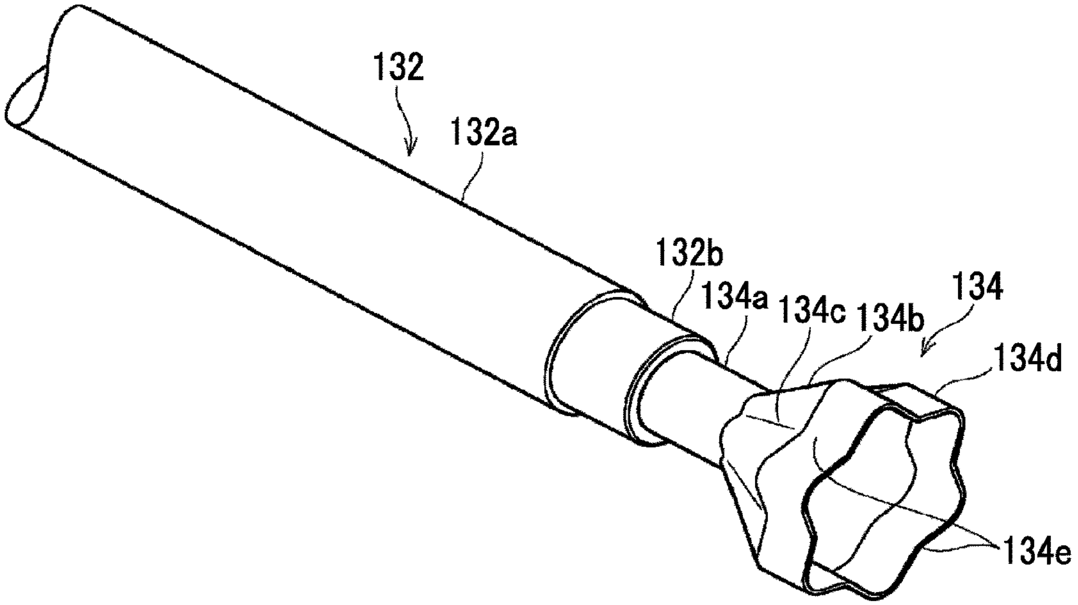
FIG. 14 is a perspective view illustrating an inner layer of the bumper by removing an outer layer of the bumper and corresponds to FIG. 13.
Figure 15:
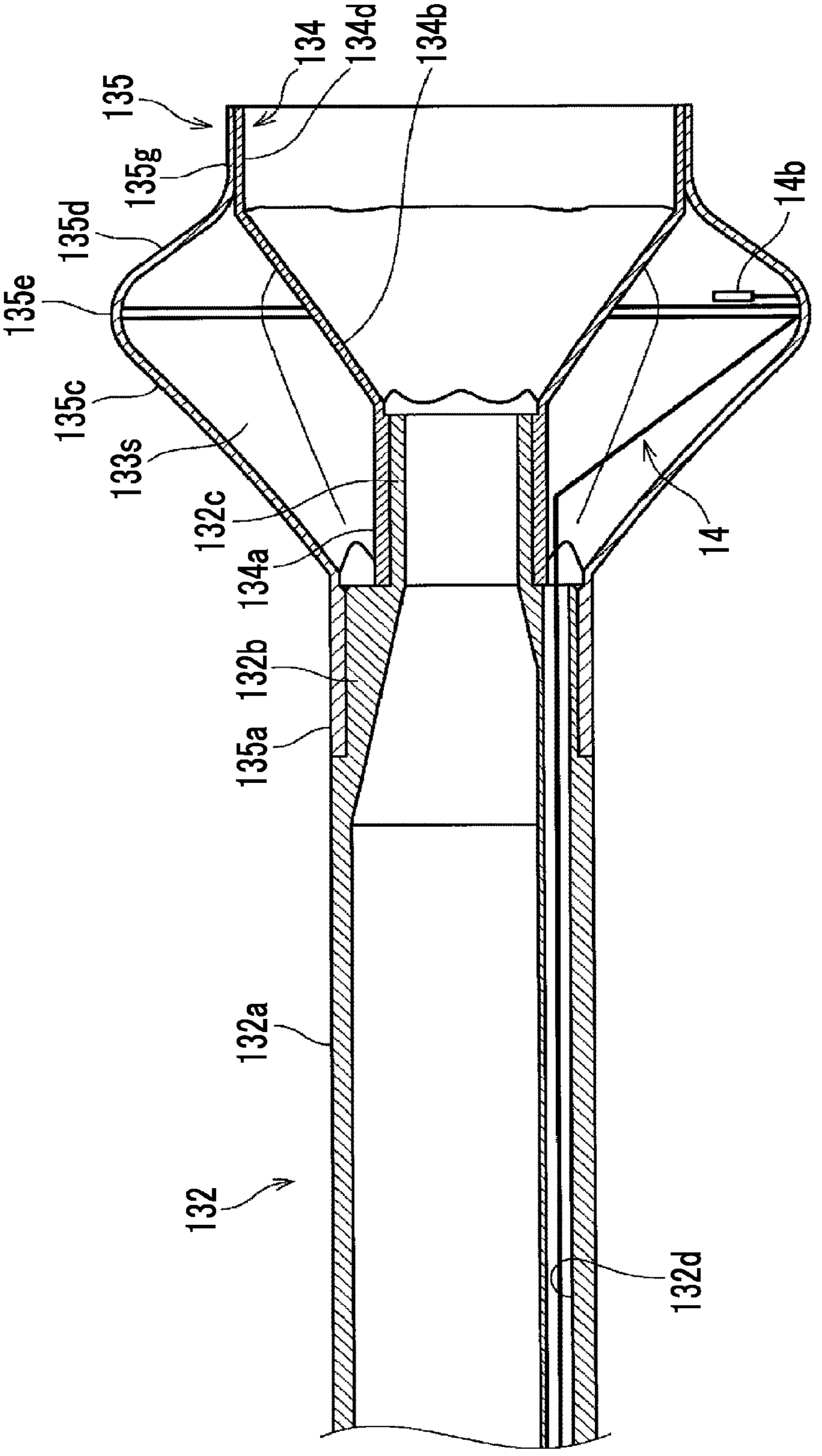
FIG. 15 is a cross-sectional view illustrating a 1XV-1XV cross section of the bumper and the shaft of FIG. 13.

Next, a bumper 133 and a shaft 132 to which the bumper 133 is attached according to Modification Example 1-4 will be described mainly with reference to FIGS. 13 to 15. FIG. 13 is a perspective view illustrating the bumper 133 and the shaft 132 to which the bumper 133 is attached according to Modification Example 1-4, FIG. 14 is a perspective view illustrating an inner layer 134 of the bumper 133 by removing an outer layer 135 of the bumper 133 and corresponds to FIG. 13. FIG. 15 is a cross-sectional view illustrating a 1XV-1XV cross section of the bumper 133 and the shaft 132 of FIG. 13.

The bumper 133 according to the present embodiment is formed in a star shape when viewed from an axial direction of the bumper 133 and is connected to a tip portion of the shaft 132.

The shaft 132 has a shaft main body 132*a* and a tip portion (a first tip portion 132*b* and a second tip portion 132*c* illustrated in FIG. 15) which is formed to have a diameter smaller than those of other sites (the shaft main body 132*a*). The bumper 133, which will be described in detail later, extends from the tip portion of the shaft 132.

The first tip portion 132*b* is formed continuously from the shaft main body 132*a* to the tip side and has a diameter smaller than that of the shaft main body 132*a*. The second tip portion 132*c* is formed continuously from the first tip portion 132*b* to the tip side and has a diameter smaller than that of the first tip portion 132*b*.

A connection tubular portion 134*a* of the inner layer 134 of the bumper 133, which will be described later, is connected to the tip portion (second tip portion 132*c*) of the shaft 132, and the inner layer 134 extends. In addition, a connection tubular portion 135*a* of the outer layer 135 of the bumper 133, which will be described later, is connected to the tip portion (first tip portion 132*b*) of the shaft 132, and the outer layer 135 extends.

According to the above configuration, a maximum deformation amount of the bumper 133 in the diameter-increasing direction connected to the first tip portion 132*b* of the shaft 132 can be made larger than a case where the tip portion (first tip portion 132*b*) of the shaft 132 is formed in the same diameter as that of the shaft main body 132*a*.

That is, as described later, the inclination of the bumper 133 (an inclined portion 135*c* thereof) after the deformation in the axial direction can be increased by the wire 14 (refer to FIG. 15) partially provided in the bumper 133. Therefore, a contact area between the deformed bumper 133 and the inner surface of the stomach wall 151 (refer to FIG. 5) can increase, and the bumper 133 can be easily placed in the stomach 152.

As illustrated in FIG. 15, the bumper 133 includes the inner layer 134 and the outer layer 135, a space 133*s* is provided between the inner layer 134 and the outer layer 135, and a portion on the tip side of the linear member (wire 14) is disposed in the space 133*s*.

In addition, as illustrated in FIG. 15, the shaft 132 includes one sub-lumen 132*d* described later through which the wire 14 passes and which extends in parallel with the axial direction. The sub-lumen 132*d* penetrates a tip surface of the first tip portion 132*b* and communicates with the space 133*s* between the inner layer 134 and the outer layer 135 of the bumper 133 attached to the tip portion of the shaft 132.

According to this configuration, the space 133*s* accommodating a portion of the wire 14 can be formed between the inner layer 134 and the outer layer 135. Further, since the space 133*s* is formed and a rigidity is reduced, when the wire 14 is pulled out from the bumper 133, the bumper 133 can be smoothly deformed into a folded state.

On a surface of the outer layer 135 of the bumper 133, a plurality of concave portions 135*f* which are depressed in the radial direction of the bumper 133 and extend along the axial direction of the bumper 133 are formed in a circumferential direction of the bumper 133.

As described above, since the concave portions 135*f* are formed on the surface of (the outer layer 135 of) the bumper 133, the bumper 133 can be smoothly deformed into a folded state. Specifically, when the bumper 133 is folded, a load applied from the wall of the fistula 153 (refer to FIG. 5) is locally applied to a portion other than the concave portions 135*f* of the bumper 133, and a starting point of the folding occurs in the concave portions 135*f*. Since the concave portions 135*f* are a space for the folding, the bumper 133 can be smoothly deformed into a folded state.

The outer layer 135 of the bumper 133 includes, from a base end side to a tip side thereof, the connection tubular portion 135*a* which is connected to the shaft 132, a large diameter portion 135*b* which has a maximum diameter portion 135*e*, and a small diameter portion 135*g* which is provided on a tip side from the large diameter portion 135*b*.

The inner layer 134 of the bumper 133 includes, from a base end side to a tip side thereof, the connection tubular portion 134*a* which is connected to the shaft 132, an inclined portion 134*b* which extends to be inclined in a diameter-increasing direction from a tip of the connection tubular portion 134*a* to a base end of a tip portion 134*d*, and the tip portion 134*d* which is provided on a tip side from the inclined portion 134*b*.

The connection tubular portion 135*a* is connected to the first tip portion 132*b* of the shaft 132, and an inner diameter of the connection tubular portion 135*a* is substantially equal to an outer diameter of the first tip portion 132*b*.

The large diameter portion 135*b* has the inclined portion 135*c* which is inclined so as to increase in diameter toward the tip in a direction parallel to a axial direction of the shaft 132 including the maximum diameter portion 135*e*, the maximum diameter portion 135*e*, and an inclined portion 135*d* which is inclined so as to decrease in diameter toward the tip.

As illustrated in FIG. 15, the tip portion 14*b* of the wire 14 is accommodated in a plane space perpendicular to the axial direction of the bumper 133 including the maximum diameter portion 135*e*. As described above, since the inclined portion 135*c* and the inclined portion 135*d* are formed on both sides of the maximum diameter portion 135*e*, when the tip portion 14*b* of the wire 14 inserted into the space 133*s* is elastically restored in the radial direction, the tip portion 14*b* is suitably guided in the above plane space including the maximum diameter portion 135*e*.

The maximum diameter portion 135*e* of the outer layer 135 of the bumper 133 is formed at a position separated from the tip of the shaft 132 toward the tip side.

As described above, since the maximum diameter portion 135*e* is formed at the position separated from the tip of the shaft 132 toward the tip side, the bumper 133 is prevented from covering and overlapping the shaft 132 when the maximum diameter portion 135*e* is contracted, and thus, the folded shape of the bumper 133 can be made compact.

The plurality of concave portions 135*f* are formed in the large diameter portion 135*b* of the outer layer 135 in the circumferential direction, and a plurality of concave portions 135*h* are formed in the small diameter portion 135*g* in the circumferential direction. The concave portions 135*f* and 135*h* in the large diameter portion 135*b* and the small diameter portion 135*g* are formed at corresponding positions in the circumferential direction of the bumper 133.

Since the plurality of concave portions 135*f* and 135*h* formed in the large diameter portion 135*b* and the small diameter portion 135*g* are formed at the corresponding positions in the circumferential direction, sites of starting points at which the large diameter portion 135*b* and the small diameter portion 135*g* are folded become linear over the large diameter portion 135*b* and the small diameter portion 135*g*. Therefore, the outer layer 135 of the bumper 133 can be smoothly deformed into a folded state.

The "corresponding position in the circumferential direction" specifically means that the positions are located at the same angle about the axis of the bumper 133 when the bumper 133 is viewed from the axial direction.

Similarly, a plurality of concave portions 134*c* are formed in the inclined portion 134*b* of the inner layer 134 in the circumferential direction, and a plurality of concave portions 134*e* are formed in the tip portion 134*d* in the circumferential direction. The concave portions 134*c* and 134*e* in the inclined portion 134*b* and the tip portion 134*d* are formed at corresponding positions in the circumferential direction of the bumper 133.

Since the plurality of concave portions 134*c* and 134*e* formed in the inclined portion 134*b* and the tip portion 134*d* are formed at corresponding positions in the circumferential direction, sites of starting points at which the inclined portion 134*b* and the tip portion 134*d* are folded become linear over the inclined portion 134*b* and the tip portion 134*d*. Therefore, the inner layer 134 of the bumper 133 can be smoothly deformed into the folded state.

Further, in the present embodiment, the concave portions 135*f* of the outer layer 135 and the concave portions 134*c* of the inner layer 134, and the concave portions 135*h* of the outer layer 135 and the concave portions 134*e* of the inner layer 134 are provided at positions overlapping in the radial direction of the bumper 133. In other words, a straight line which connects the most depressed sites of the concave portions 135*f* and 134*c* and the concave portions 135*h* and 134*e* and extends in the radial direction of the bumper 133 has a positional relationship intersecting with the axis of the bumper 133.

According to this configuration, an interference between the inner layer 134 and the outer layer 135 is suppressed, and the bumper 133 can be smoothly deformed into the folded state.

In the large diameter portion 135*b*, the inner layer 134 and the outer layer 135 are separated from each other, and in the small diameter portion 135*g*, the inner layer 134 (strictly, the tip portion 134*d*) is in contact with the outer layer 135.

According to the above configuration, since the inner layer 134 and the outer layer 135 are separated from each other in the large diameter portion 135*b*, rigidity is reduced, and thus, the contraction is easily performed. Further, since the inner layer 134 and the outer layer 135 are in contact with each other at the small diameter portion 135*g*, the rigidity can increase, and thus, excellent shape retention can be obtained.

Modification Example 1-5

In the embodiment illustrated in FIG. 8, when the wire 14 is removed from the bumper 13 in the case where the bumper 13 of the gastrostomy catheter 11 is removed from inside the stomach, the base end holding portion 15 *c* is cut off from the extracorporeal fixing unit 15. Further, in the embodiment illustrated in FIG. 10, the base end holding portion 115*a* is removed from the extracorporeal fixing unit 15 by releasing the locking of the locking protrusion 115*b* to the concave groove 115*c*. However, the present invention is not limited to this configuration.

Figure 16:
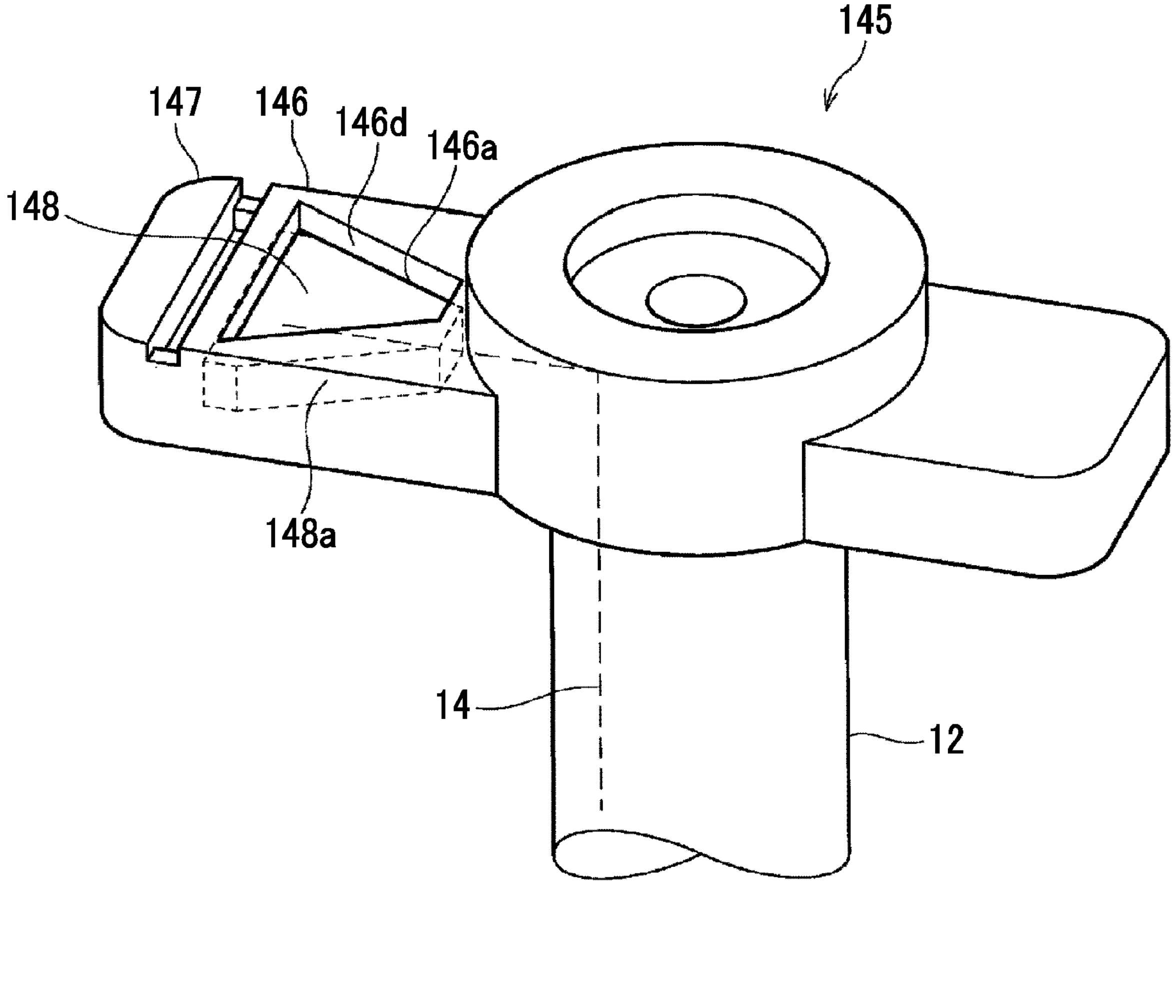
FIG. 16 is a perspective view illustrating an extracorporeal fixing unit including a base end holding portion and a support portion for supporting the base end holding portion according to Modification Example 1-5.
Figure 17A:
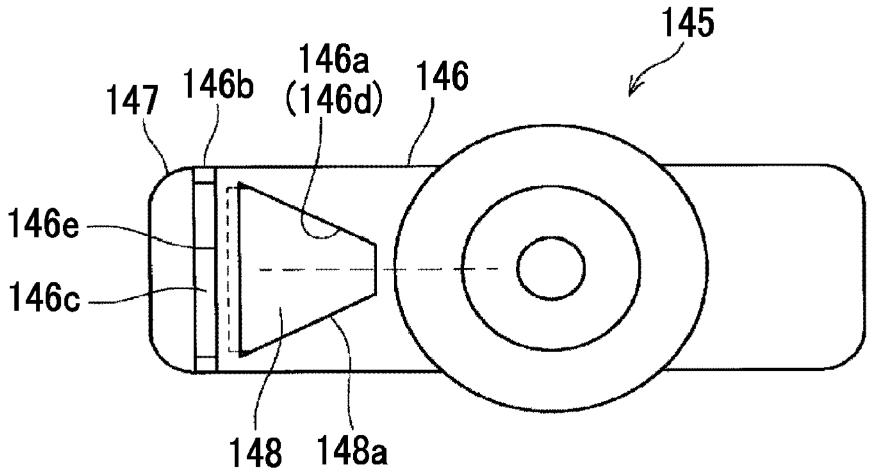
FIG. 17A is a plan view illustrating an extracorporeal fixing unit in an initial state.
Figure 17B:
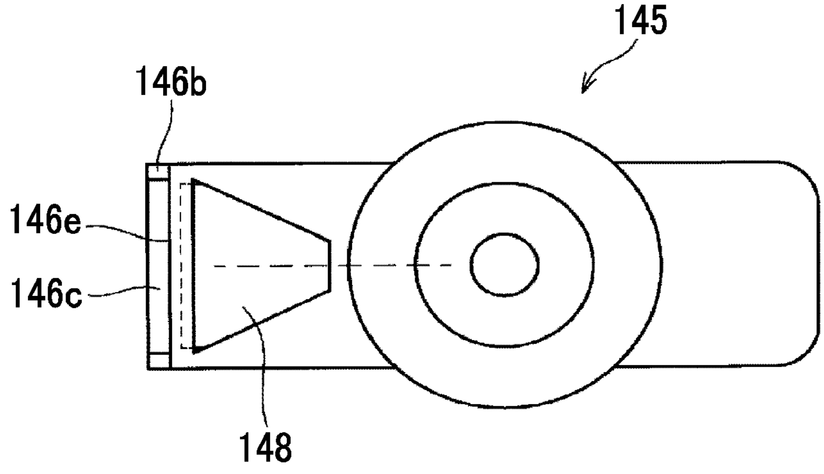
FIG. 17B is a plan view illustrating a state in which a restriction unit is removed from the extracorporeal fixing unit.
Figure 17C:
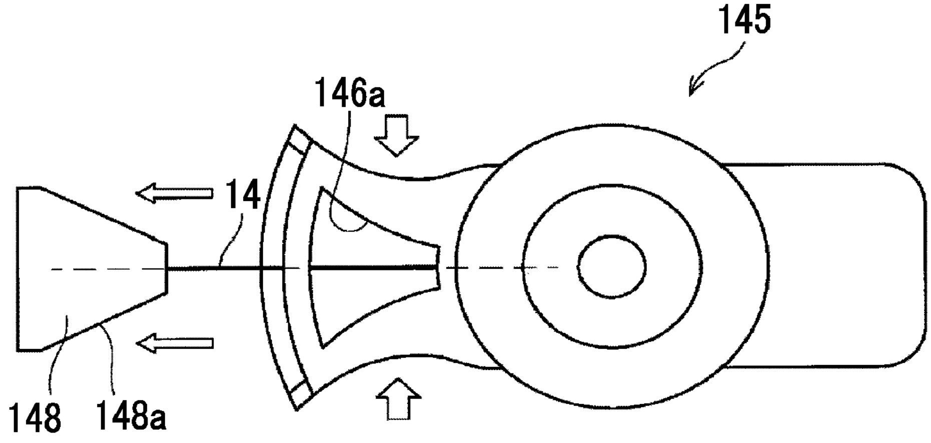
FIG. 17C is a plan view illustrating a state in which the support portion is pushed in from both sides and the base end holding portion is pushed out from the extracorporeal fixing unit.

Next, an extracorporeal fixing unit 145 according to Modification Example 1-5 will be described mainly with reference to FIGS. 16 and 17. FIG. 16 is a perspective view illustrating an extracorporeal fixing unit 145 including a base end holding portion 148 and a support portion 146 for supporting the base end holding portion 148 according to Modification Example 1-5. FIG. 17A is a plan view illustrating the extracorporeal fixing unit 145 in an initial state, FIG. 17B is a plan view illustrating a state in which a restriction piece 147 is removed from the extracorporeal fixing unit 145, and FIG. 17C is a plan view illustrating a state in which the support portion 146 is pushed in from both sides and the base end holding portion 148 is pushed out from the extracorporeal fixing unit 145. In FIGS. 16 and 17, the cap 16 and the strap 17 illustrated in FIG. 1 is not illustrated.

A fixing portion (extracorporeal fixing unit 145) according to Modification Example 1-5 has the support portion 146 which movably supports the base end holding portion 148, and the restriction unit (restriction unit 147) which restricts a movement of the base end holding portion 148 and detachment thereof from the support portion 146.

The base end holding portion 148 according to the present embodiment is a plate piece having a trapezoidal thickness in a plan view, and the base end portion of the wire 14 is embedded inside the base end holding portion 148. The base end holding portion 148 has an inverted tapered portion 148*a* formed so as to expand toward the outside of the fixing portion (extracorporeal fixing unit 145).

The support portion 146 includes a bottom wall 146*c* which supports the base end holding portion 148 from below, and connection walls 146*b* which are provided on both sides of the bottom wall 146*c* and stand uprightly. The bottom wall 146*c* and the connection wall 146*b* protrude outward from the other sites of the support portion 146 in an extension direction of the extracorporeal fixing unit 145.

In the support portion 146, a trapezoidal opening 146*d* in a plan view, which exposes at least a portion of the base end holding portion 148, is formed on a proximal side of the support portion 146. Since the opening 146*d* is formed in this manner, the surgeon can touch the base end holding portion 148 with a finger and separate the base end holding portion 148 from the extracorporeal fixing unit 145, in addition to picking the support portion 146 from both sides as described later.

The restriction piece 147 is connected to the connection walls 146*b* and the bottom wall 146*c* of the support portion 146, and is provided in a size and a position overlapping in a thickness direction with respect to the base end holding portion 148 in a direction in which the base end holding portion 148 is detached from the support portion 146.

As illustrated in FIG. 17B, the base end holding portion 148 is configured to be separable from the support portion 146 by separating the restriction piece 147 from the support portion 146.

The extracorporeal fixing unit 145 has the support portion 146 and the restriction piece 147. Accordingly, as compared with a case where the entire base end holding portion 148 is connected to the extracorporeal fixing unit 145, the base end holding portion 148 can be easily separated from the support portion 146 only by separating the restriction piece 147 from the support portion 146.

In the present embodiment, as the configuration in which the base end holding portion 148 can be separated, the support portion 146 is not provided on a path where the base end holding portion 148 is projected on the restriction piece 147, and a through hole 146*e* illustrated in FIG. 17A and FIG. 17B is formed. According to this configuration, the movement of the base end holding portion 148 in the direction toward the restriction piece 147 is not restricted by the support portion 146, and the movement is restricted only by the restriction piece 147.

The support portion 146 has a facing portion 146*a* which extends along the inverted tapered portion 148*a* of the base end holding portion 148 in a state in which the support portion 146 is attached to the extracorporeal fixing unit 145. The support portion 146 is configured to be deformable so that the facing portion 146*a* abuts on the inverted tapered portion 148*a* and the base end holding portion 148 can be pushed into the outside of the fixing portion (extracorporeal fixing unit 145) after the restriction piece 147 is separated from the support portion 146.

According to this configuration, as illustrated in FIG. 17C, the surgeon grasps the support portion 146 from both sides in a direction (in directions of thick arrows) sandwiching the base end holding portion 148, and deforms the facing portion 146*a* of the support portion 146. Then, a component force (in directions of thin arrows) of the load applied to the inverted tapered portion 148*a* from the facing portion 146*a* toward the outside in the extension direction of the extracorporeal fixing unit 145 is generated, and thus, the base end holding portion 148 is easily removed from the support portion 146 to the outside of the extracorporeal fixing unit 145.

The "outside of the extracorporeal fixing unit 145" is not limited to a direction away from the shaft 12 (refer to FIG. 16) in the extension direction of the extracorporeal fixing unit 145, but may be a direction outward from a center of a thickness of the extracorporeal fixing unit 145 in direction intersecting the extension direction of the extracorporeal fixing unit 145. The term "deformable" is a concept including elastic deformation and plastic deformation.

The shape of the base end holding portion 148 is not limited to a trapezoidal shape including the inverted tapered portion 148*a* in a plan view, and for example, may be formed in a pair of arcs instead of the linear inverted tapered portion 148*a*. That is, the shape of the base end holding portion 148 may be a shape which is enlarged (in the direction in which the base end holding portion 148 is taken out) toward the outside of the extracorporeal fixing unit 145.

<<Overview>>

Figure 18:
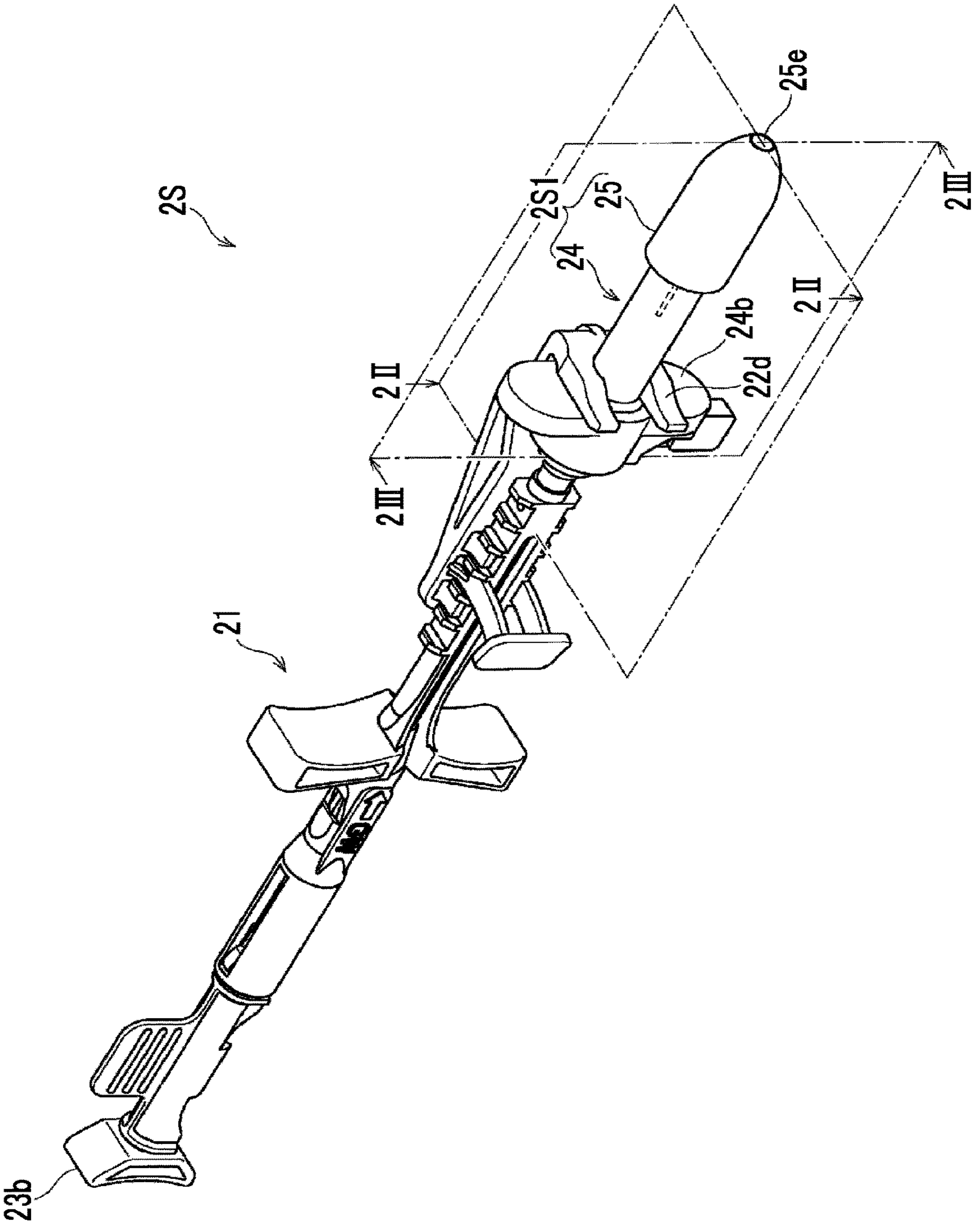
FIG. 18 is a perspective view illustrating an insertion jig set according to an embodiment of the present invention and illustrates a state in which a cap restrains the bumper so that the bumper is folded.
Figure 19:
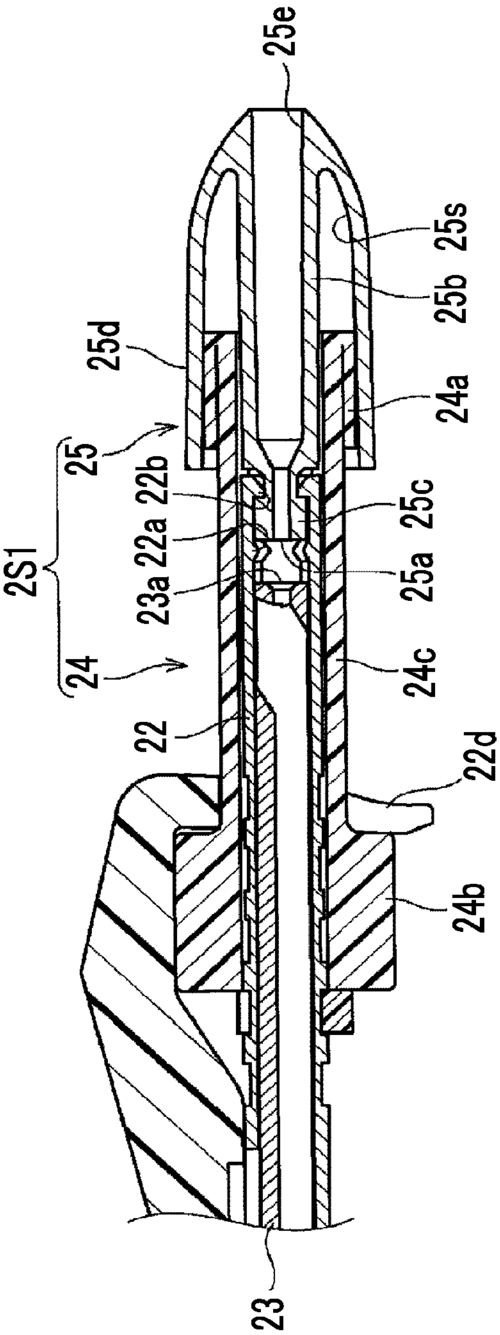
FIG. 19 is a partial cross-sectional view illustrating a portion of the insertion jig set and is a view illustrating a 2II-2II cross section of FIG. 18.
Figure 20:
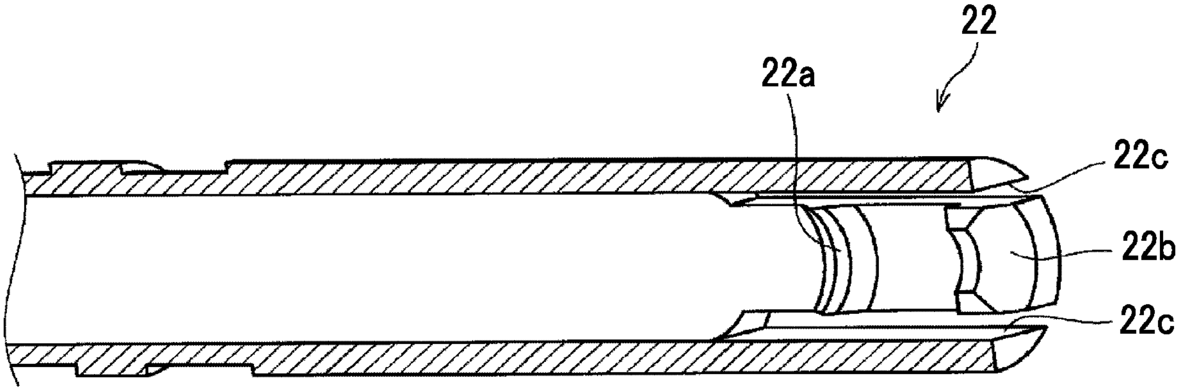
FIG. 20 is a partial cross-sectional perspective view illustrating a cross section of a distal end portion of a mantle portion and is a view illustrating a 2III-2III cross section of FIG. 18.
Figure 21:
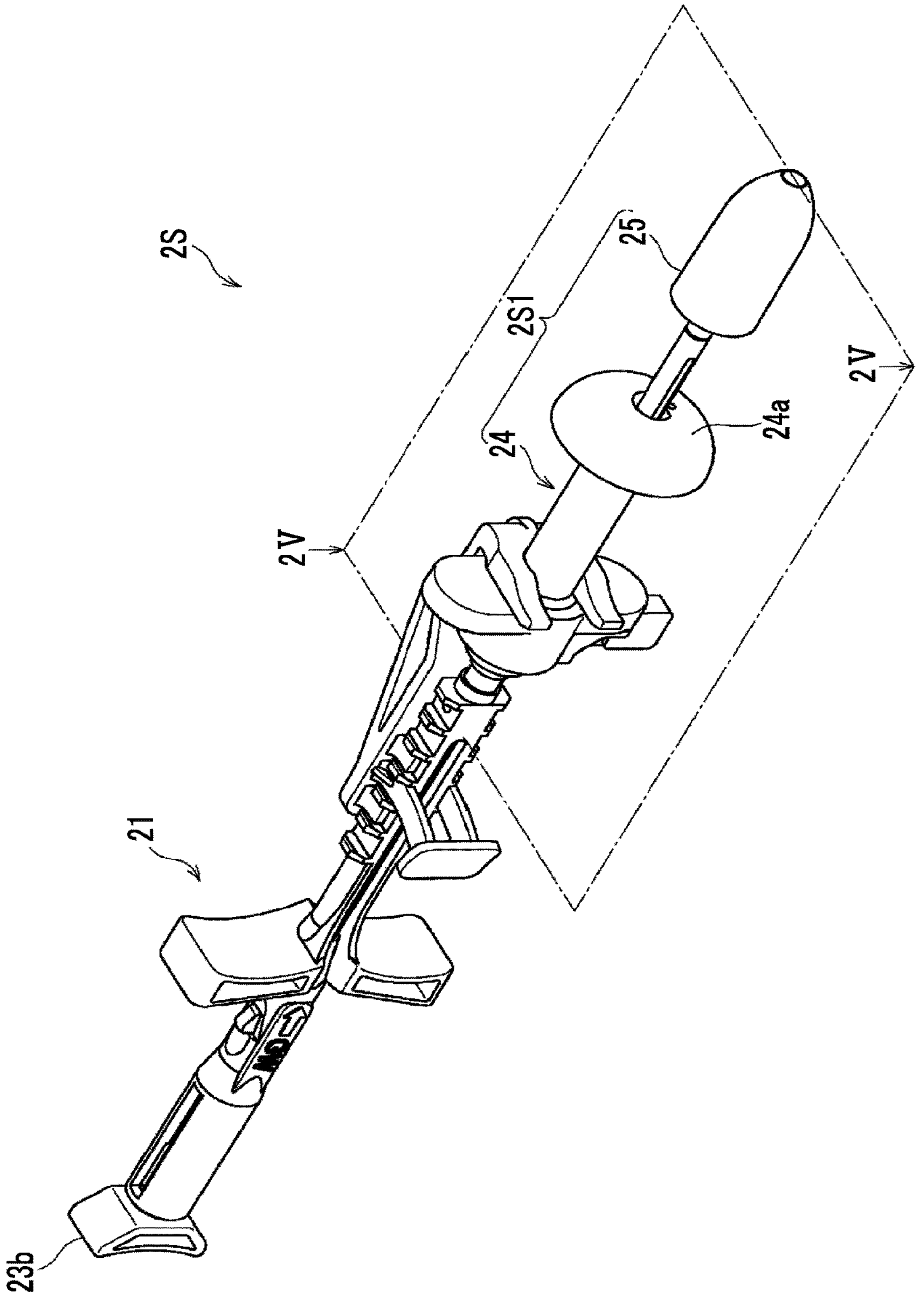
FIG. 21 is a perspective view illustrating the insertion jig set and illustrates a state in which the cap releases the bumper to expand the bumper.
Figure 22:
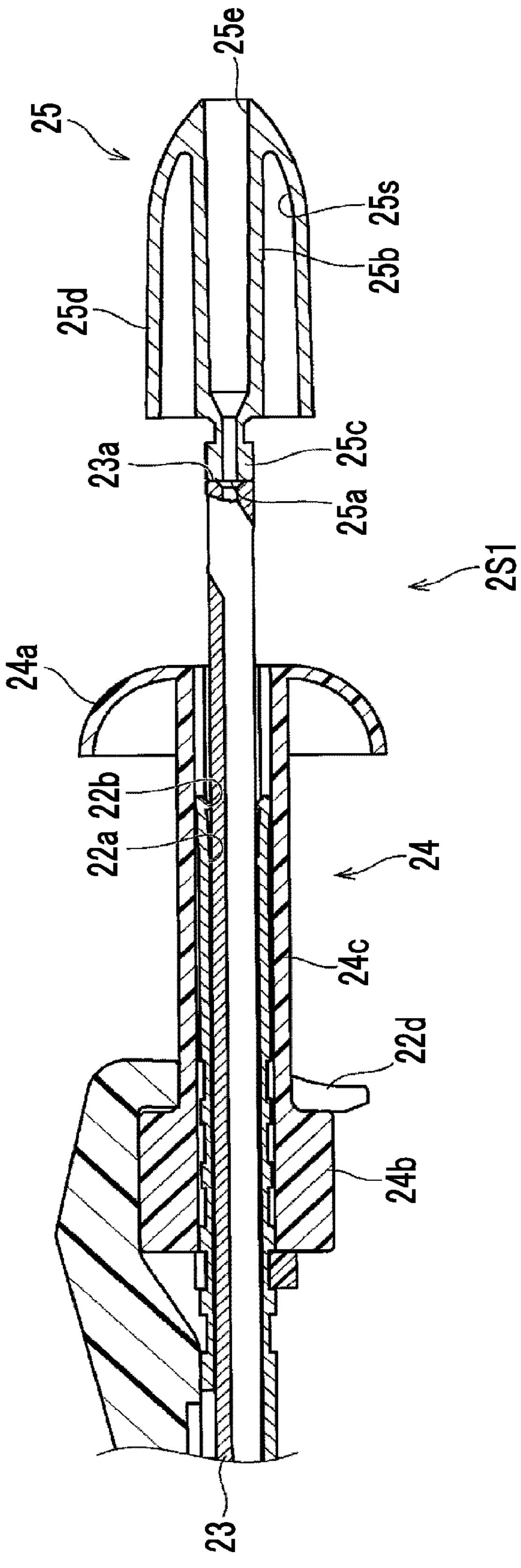
FIG. 22 is a partial cross-sectional view illustrating a portion of the insertion jig set and is a view illustrating a 2V-2V cross section in FIG. 21.

First, an outline of each of an insertion jig set 2S and an insertion jig (obturator 21) according to the present embodiment will be described with reference to FIGS. 18 to 22. FIG. 18 is a perspective view illustrating the insertion jig set 2S according to an embodiment of the present invention and illustrates a state in which a cap 25 restrains a bumper 24*a* so that the bumper 24*a* is folded, and FIG. 19 is a partial cross-sectional view illustrating a portion of the insertion jig set 2S and is a view illustrating a 2II-2II cross section of FIG. 18. FIG. 20 is a partial cross-sectional perspective view illustrating a cross section of a distal end portion of a mantle portion 22 and is a view illustrating a 2III-2III cross section of FIG. 18. FIG. 21 is a perspective view illustrating the insertion jig set 2S and illustrates a state in which the cap 25 releases the bumper 24*a* to expand the bumper. FIG. 22 is a partial cross-sectional view illustrating a portion of the insertion jig set 2S and is a view illustrating a 2V-2V cross section in FIG. 21.

In the present specification, a "distal side" refers to a side of the insertion jig set 2S and the obturator 21 far from an operator of the insertion jig set 2S and the obturator 21, unless otherwise specified, and specifically, refers to a side attached to the cap 25 or covered with the cap 25. Further, the distal side may be referred to as a tip side.

Moreover, a "proximal side" refers to a side of the insertion jig set 2S and the obturator 21 closer to the operator unless otherwise specified. In addition, the proximal side may be referred to as a base end side.

Moreover, components of the insertion jig set 2S moving to the distal side may be referred to moving forward, and the components moving to the proximal side may be referred to moving rearward.

The insertion jig set 2S according to the embodiment of the present invention is an insertion jig set 2S for inserting a gastrostomy catheter 24 having a foldable gastrointestinal fixing portion (bumper 24*a*) at a tip into a body (into the stomach).

The insertion jig set 2S includes the insertion jig (obturator 21) configured to include the tubular mantle portion 22 and an inner insertion portion 23 which is movable forward and rearward through the mantle portion 22, the gastrostomy catheter 24 which is attached around the mantle portion 22, and the cap 25 which is disposed on a tip side of the mantle portion 22 and covers at least a portion of the folded gastrointestinal fixing portion (bumper 24*a*).

One of the gastrostomy catheter 24 or the mantle portion 22 and the cap 25 has a locking portion (locking claw 22*b*) which is locked to the other, and when the inner insertion portion 23 moves forward through the mantle portion 22, the locking by the locking claw 22*b* is released.

According to the above configuration, the gastrostomy catheter 24 or the mantle portion 22 and the cap 25 are locked to each other, and the locking can be released by the inner insertion portion 23. Accordingly, the cap 25 can be prevented from being unexpectedly detached from the gastrostomy catheter 24 and the mantle portion 22.

In the present invention, the term "lock" refers to a state in which movement is restricted by being temporarily held and fixed, and in addition to a structurally locked state described below, includes a state of being physically adhered with an adhesive or the like so as to be detachable.

As a configuration for releasing the locking by the locking portion when the inner insertion portion 23 moves forward through the mantle portion 22, there is a configuration in which the inner insertion portion 23 moving forward directly or indirectly abuts on a member including the locking portion, a locking force of the locking portion is weakened by deforming the member, and the locking is released.

In addition, there is a configuration in which the inner insertion portion 23 moving forward directly or indirectly abuts on the member including the locking portion or a member to be locked and presses the member, and the locking by the locking portion is released by applying a load stronger than the locking force by the locking portion between the locking portion and the member having the locking or the member to be locked. Details of these will be described later.

The insertion jig (obturator 21) according to the embodiment of the present invention inserts the gastrostomy catheter 24 having a foldable gastrointestinal fixing portion (bumper 24*a*) at the tip and the cap 25 covering at least a portion of the folded gastrointestinal fixing portion into the body.

The insertion jig (obturator 21) is configured to include the tubular mantle portion 22 around which the gastrostomy catheter 24 can be attached, and an inner insertion portion 23 which passes through the mantle portion 22. The mantle portion 22 has the locking portion (locking claw 22*b*) which is locked to the cap 25.

The inner insertion portion 23 releases the locking by the locking claw 22*b* when the inner insertion portion 23 moves forward through the mantle portion 22.

According to the above configuration, the mantle portion 22 and the cap 25 are locked to each other and the locking can be released by the inner insertion portion 23. Accordingly, the cap 25 is prevented from being unexpectedly detached from the mantle portion 22.

The gastrostomy catheter set 2S1 according to the embodiment of the present invention is configured to include the gastrostomy catheter 24 having the foldable gastrointestinal fixing portion (bumper 24*a*) at the tip and the cap 25 covering at least a portion of the folded bumper 24*a*.

The gastrostomy catheter 24 is formed so that a portion of the insertion jig (obturator 21) for inserting the gastrostomy catheter 24 into the stomach can be inserted, and the cap 25 has a locked portion (locked block 25*c*) which is locked to the locking claw 22*b* of the obturator 21.

Since the cap 25 has the locked portion which is locked to the obturator 21, the cap 25 can be prevented from being unexpectedly detached from the gastrostomy catheter 24.

<<Configuration>>

Next, the configurations of the insertion jig set 2S and the insertion jig (obturator 21) will be described with reference to FIGS. 18 to 22. As described above, the insertion jig set 2S includes the obturator 21 for inserting the gastrostomy catheter 24 into the body, the gastrostomy catheter 24 attached around the mantle portion 22, and the cap 25 which is disposed on the tip side of the mantle portion 22 and covers at least a portion of the folded gastrointestinal fixing portion.

<Obturator>

As described above, the obturator 21 is configured to include the mantle portion 22 and the inner insertion portion 23.

A holding portion 22*d* for holding an extracorporeal fixing portion 24*b* located on a proximal side of the gastrostomy catheter 24 is provided at a central portion of the mantle portion 22. The holding portion 22*d* has a forked portion extending in a direction intersecting an axial direction of the obturator 21, and holds the extracorporeal fixing portion 24*b* of the gastrostomy catheter 24 by the forked portion.

The gastrostomy catheter 24 which has passed through a distal end of the mantle portion 22 is attached to an outer periphery of a distal end portion of the mantle portion 22.

At a proximal end of the obturator 21, an operation unit 23*b* continuous to the inner insertion portion 23 is provided at a proximal end of the obturator 21, and the surgeon reciprocates the operation unit 23*b* in the axial direction with respect to the mantle portion 22 so that the inner insertion portion 23 can reciprocate.

As illustrated in FIG. 20, four slits 22*c* are formed at a tip portion of the mantle portion 22, and the slits 22*c* extend in the axial direction of the mantle portion 22 until the slits 22 reach the tip of the mantle portion 22. The tip portion of the mantle portion 22 is divided into four pieces by the four slits 22*c*. The term "extension in the axial direction" means extension including an axial component, and includes not only extension in a direction parallel to the axial direction but also extension in a direction oblique with respect to the axial direction.

Since the slit 22*c* is formed at the tip portion of the mantle portion 22, the tip side of the mantle portion 22 can be easily expanded. For this reason, when the surgeon moves the inner insertion portion 23 forward to release the locking by the locking claws 22*b* as described later, the cap 25 can be smoothly detached from the mantle portion 22.

When the number of the slits 22*c* is four, the distal end portion of the mantle portion 22 can be divided into four pieces, and facing two pieces can be bent and deformed in a well-balanced manner. Therefore, it is preferable because the locking of the locked block 25*c* of the cap 25 and the release of the locking by the locking claw 22*b* described later can be stably performed. However, the present invention is not limited to this configuration, and the number of slits 22*c* is arbitrary as long as a diameter of the distal end portion of the mantle portion 22 can increase to release the locking of the cap 25. Further, for example, in a case where the mantle portion 22 is formed of a material which can be elastically deformed, the slit 22*c* need not be provided.

The mantle portion 22 include the locking portion (locking claw 22*b*) for locking a portion of the cap 25.

The locking claw 22*b* is provided on an inner wall surface of the mantle portion 22, and is configured to be locked to a constricted portion of the locked block 25*c* of the cap 25 described later. More specifically, the locking claws 22*b* are provided in the facing two pieces of the four pieces divided at the tip portion of the mantle portion 22.

The present invention is not limited to the configuration in which the locking claws 22*b* are provided in the facing two pieces divided at the tip portion of the mantle portion 22. That is, the number of the locking claws 22*b* is arbitrary, and the locking claws 22*b* may be provided in all of the four pieces divided at the tip portion of the mantle portion 22. If the locking claws 22*b* are provided in all of the four pieces, each of the locking claws 22*b* disposed at four locations at every 90° in a circumferential direction of the mantle portion 22 is locked to the constricted portion of the locked block 25*c* of the cap 25. Therefore, it is possible to more suitably maintain the locked state with respect to the cap 25.

Further, as described above, since the plurality of slits 22*c* are further formed, when the tip portion of the mantle portion 22 is further formed of a plurality of pieces, the locking claws 22*b* may be provided in an arbitrary plurality of pieces.

The cross section of the locking claw 22*b* according to the present embodiment in the radial direction with respect to the axis of the mantle portion 22 is formed in a trapezoidal shape with the axis side as an upper side. This trapezoid is formed such that an angle on an acute side between a side on a distal side and the other nearby inner wall surface is smaller than an angle on an acute side between a side on a proximal side and the other nearby inner wall surface. That is, a surface formed to include the side on the distal side of the trapezoid is an inclined surface which is more inclined than a surface formed to include the side on the proximal side of the trapezoid.

In the present embodiment, the side on the proximal side is formed at a right angle with respect to the other nearby inner wall surface. That is, the surface on the proximal side of the locking claw 22*b* is a surface orthogonal to the axial direction of the mantle portion 22. The surface on the distal side of the locked block 25*c* provided in the cap 25, which is the object to be locked by the locking claw 22*b*, is also formed in the direction orthogonal to the axial direction of the mantle portion 22 in a state of being inserted into the distal end portion of the mantle portion 22.

When the locked block 25*c* of the cap 25 is inserted into the locking claw 22*b*, which is formed as described above, from the distal side, a proximal end surface 25*a* abuts on the inclined surface. Accordingly, a force is naturally applied in the diameter-increasing direction, and the distal end portion of the mantle portion 22 can be easily expanded.

Meanwhile, as described above, the surface on the proximal side of the locking claw 22*b* and the surface on the distal side of the locked block 25*c* are surfaces orthogonal to the axial direction of the mantle portion 22. Therefore, when the locked block 25*c* of the cap 25 is inserted up to the proximal side beyond the locking claw 22*b*, even if the cap 25 moves in the axial direction of the mantle portion 22, It is difficult for a force to be applied in a direction of expanding the distal end portion of the mantle portion 22, and it is difficult for the locking by the locking claw 22*b* to be released.

A protrusion 22*a* which protrudes radially inward is formed in each of the two inner wall surfaces of the mantle portion 22 where the locking claws 22*b* are provided. As will be described later, when the inner insertion portion 23 moves forward through the mantle portion 22 (when the inner insertion portion 23 is inserted from the proximal side to the distal side of the mantle portion 22), an outer peripheral surface of the inner insertion portion 23 abuts on the protrusions 22*a*. Accordingly, the distal sides of the two pieces of the mantle portion 22 are expanded (bent and deformed radially outward). The protrusion 22*a* is formed in an arc shape in cross section, extends in the circumferential direction, and is disposed on the proximal side from the locking portion (locking claw 22*b*). The inner insertion portion 23 abuts on the protrusions 22*a* and the mantle portion 22 is expanded. Accordingly, the locking between the cap 25 and the mantle portion 22 can be suitably released.

In addition, since the protrusion 22*a* is formed in an arc shape in cross section, the distal sides of the two pieces of the mantle portion 22 can be smoothly deformed to the outside in an external direction without obstructing the movement of the inner insertion portion 23 in the axial direction of the mantle portion 22. However, the shape of the protrusion according to the present invention is not limited to the arc shape in cross section. That is, a triangular cross section or a trapezoidal cross section may be used as long as the surface on the proximal side abutting on the outer surface of the inner insertion portion 23 is an inclined surface which is gently inclined with respect to the axial direction.

<Gastrostomy Catheter>

The gastrostomy catheter 24 allows the outside of the body and the inside of the stomach to communicate with each other through the fistula, is attached to the outer periphery of the mantle portion 22, and is fixed by holding the extracorporeal fixing portion 24*b* by the holding portion 22*d* of the obturator 21. The gastrostomy catheter 24 is configured to include the radially expandable and contractible bumper 24*a* placed in the stomach, the extracorporeal fixing portion 24*b* disposed outside a body surface, and a shaft 24*c* communicating with the bumper 24*a* and the extracorporeal fixing portion 24*b*.

The bumper 24*a* according to the present embodiment is formed in an umbrella shape, expands in the radial direction perpendicular to the axial direction in a natural state, and can be accommodated in the space 25*s* of the cap 25 described later in a folded and elastically deformed state. The bumper 24*a* is not limited to an umbrella-shaped member as long as it can expand and contract in the radial direction, and may be formed of only a plurality of bendable rod-shaped members.

<Cap>

When the bumper 24*a* is disposed in the stomach through a fistula (not illustrated), the cap 25 suppresses the resistance applied to the wall surface of the fistula while maintaining the folded state of the bumper 24*a*, and thus, the bumper 24*a* is easily inserted into the body. The cap 25 is formed of a hard capsule cover used for food made of a cellulose-based material or a gelatin-based material, or a material decomposed in the body such as polylactic acid, and a distal end side of the cap 25 is formed in a blunt cap shape.

More specifically, the cap 25 is integrally formed by the locked block 25*c*, a shaft center portion 25*b* which is provided at a radially center portion continuously from the locked block 25*c* and extends in the axial direction, and a peripheral wall 25*d* which is provided on the radially outer side in a continuous manner with a distal side of the shaft center portion 25*b*. An outer peripheral portion of the shaft center portion 25*b* and an inner peripheral portion of the peripheral wall 25*d* form a circular deep moat-shaped space 25*s* which can accommodate the folded bumper 24*a*.

At least a portion of the gastrointestinal fixing portion (bumper 24*a*) is accommodated a portion of the space 25*s* in the cap 25 except for the site (locked block 25*c*) locked to the locking portion (locking claw 22*b*) in a state illustrated in FIG. 19 in which the inner insertion portion 23 is not inserted into the distal side of the mantle portion 22.

According to this configuration, the cap 25 can accommodate at least a portion of the bumper 24*a* in a state in which the cap 25 is locked to the mantle portion 22.

The space 25*s* is formed in a size which can accommodate the bumper 24*a*. Specifically, an outer diameter of the shaft center portion 25*b* is smaller than an inner diameter of the shaft 24*c* of the gastrostomy catheter 24, and an inner diameter of a proximal end surface of the peripheral wall 25*d* is larger than an outer diameter of the shaft 24*c*.

A through hole 25*e* extends in the axial direction from the shaft center portion 25*b* to the locked block 25*c*. The through hole 25*e* allows a guide wire (not illustrated) to pass therethrough.

<<Operation>>

Next, an operation of inserting the gastrostomy catheter 24 into the body by the insertion jig set 2S will be described with reference to FIGS. 18 to 22.

The surgeon causes the gastrostomy catheter 24 with the extracorporeal fixing portion 24*b* oriented to be located on the proximal side to pass through the distal end portion of the mantle portion 22, hangs the holding portion 22*d* on the extracorporeal fixing portion 24*b*, and attaches the gastrostomy catheter 24 to the mantle portion 22. The surgeon inserts the cap 25 into the mantle portion 22 while attaching the cap 25 to the gastrostomy catheter 24 so that the bumper 24*a* of the gastrostomy catheter 24 is accommodated in the space 25*s* of the cap 25, and locks the cap 25 to the locking claw 22*b*. Here, a locking position of the cap 25 by the locking claw 22*b* is a position where the locked block 25*c* exceeds the locking claw 22*b* of the mantle portion 22.

Next, the surgeon causes the bumper 24*a* covered with the cap 25 together with the cap 25 to pass through the fistula, and pushes the gastrostomy catheter 24 by the obturator 21 up to a position (a position at which the holding portion 22*d* abuts on the surface of the abdominal wall) at which the bumper 24*a* reaches the inside of the stomach.

As illustrated in FIG. 21, the surgeon operates to push the operation unit 23*b* to the distal side, and pushes the inner insertion portion 23 to the distal side of the mantle portion 22. The inner insertion portion 23 abuts on the protrusion 22*a* when the inner insertion portion 23 moves forward through the mantle portion 22 and applies a bending load to the two pieces having the protrusion 22*a* at the distal end portion of the mantle portion 22 to expand the two pieces of the distal end portion of the mantle portion 22.

Therefore, the locking to the locked block 25*c* by the locking claws 22*b* provided at the two distal ends of the mantle portion 22 is released, and the cap 25 can fall into the stomach by its own weight. Since the cap 25 which has fallen into the stomach is a material which is edible or decomposed in the body as described above, the cap 25 is excreted or dissolved together with the content of the stomach and has no effect on the body.

In this way, the bumper 24*a* released from the restraint by the cap 25 can be expanded in the radial direction, and the bumper 24*a* of the gastrostomy catheter 24 can be placed in the stomach.

In the above description, the configuration is described in which the mantle portion 22 is expanded to release the locking of the locking claw 22*b* and the cap 25 is detached from the mantle portion 22 by the weight of the cap 25. Further, as illustrated in FIGS. 21 and 22, it is preferable that the inner insertion portion 23 is configured to be movable forward up to the position at which the inner insertion portion 23 abuts on the proximal end portion (proximal end surface 25*a*) of the cap 25 and the cap 25 can be detached from the gastrostomy catheter 24 and the mantle portion 22.

According to the above configuration, even if the cap 25 is not detached from the gastrostomy catheter 24 and the mantle portion 22 only by releasing the locking between the locking claw 22*b* and the cap 25, the inner insertion portion 23 abuts on the proximal end surface 25*a* of the cap 25 such that the cap 25 can be reliably detached.

When the inner insertion portion 23 abuts on the proximal end surface 25*a* of the cap 25 and is pushed in to remove the cap 25, the extracorporeal fixing portion 24*b* is held by the holding portion 22*d* of the obturator 21 and the gastrostomy catheter 24 does not move. Accordingly, the cap 25 can be relatively moved.

Modification Example 2-1

In the obturator 21 according to the above embodiment, the configuration is described in which the inner insertion portion 23 abuts on the protrusion 22*a* of the mantle portion 22 to expand the distal end portion of the mantle portion 22. However, the present invention is not limited to this configuration.

Figure 23:
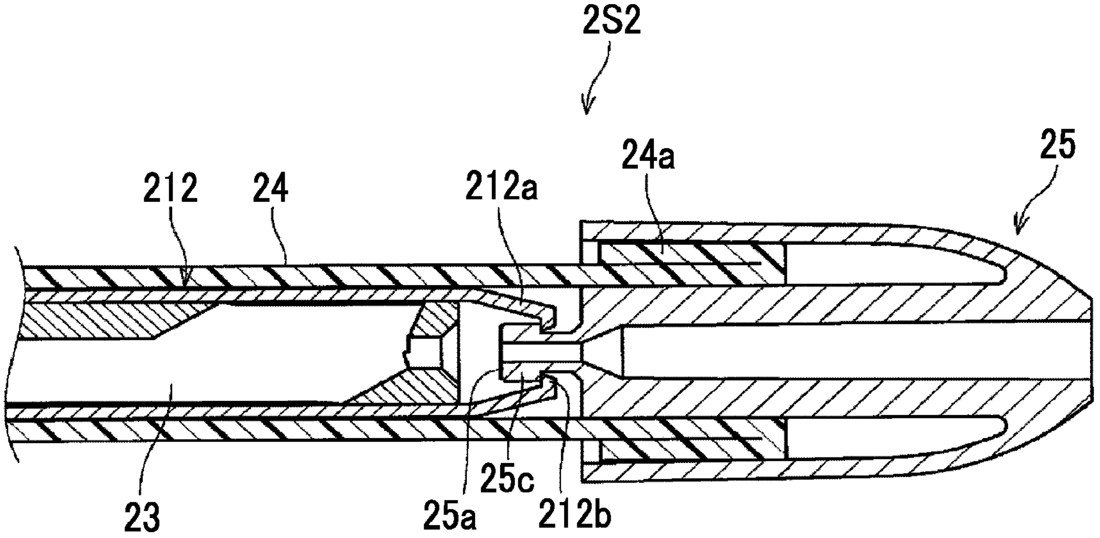
FIG. 23 is a cross-sectional view illustrating a locking structure between a mantle portion and a cap according to Modification Example 2-1 and illustrates a bent end portion in a closed arm state.
Figure 24:
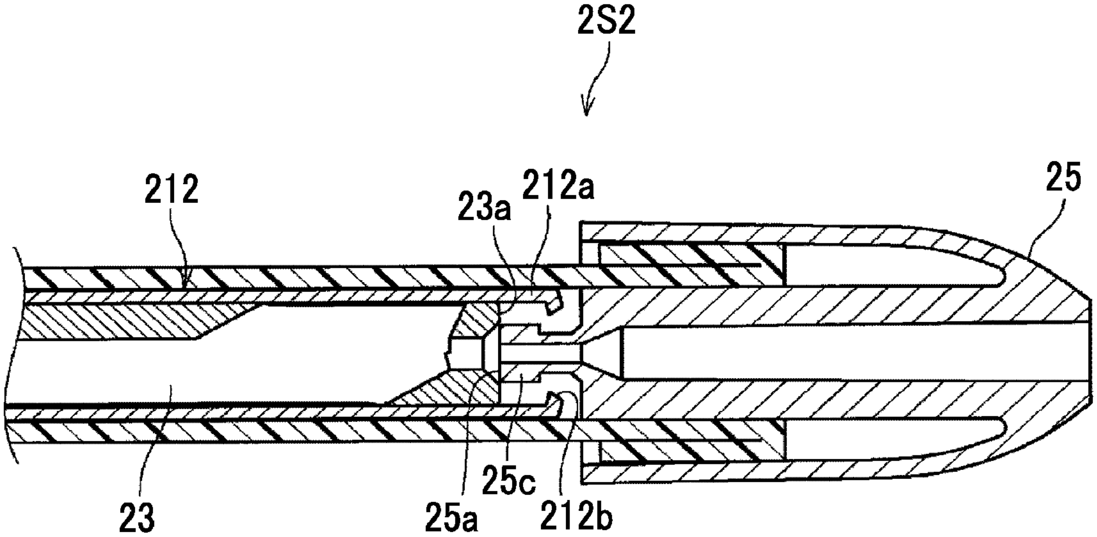
FIG. 24 is a cross-sectional view illustrating the locking structure between the mantle portion and the cap according to Modification Example 2-1 and is a view illustrating the bent end portion in an open arm state.

Next, a locking structure according to Modification Example 2-1 will be described mainly with reference to FIGS. 23 and 24. FIG. 23 is a cross-sectional view illustrating a locking structure between a mantle portion 212 and a cap 25 according to Modification Example 2-1 and illustrates a bent end portion 212*a* in a closed arm state, and FIG. 24 is a cross-sectional view illustrating the locking structure between the mantle portion 212 and the cap 25 and is a view illustrating the bent end portion 212*a* in an open arm state.

A gastrostomy catheter set 2S2 according to the present modification example is configured to include the gastrostomy catheter 24 having the foldable gastrointestinal fixing portion (bumper 24*a*) at the tip, and the cap 25 covering at least a portion of the folded bumper 24*a*.

The gastrostomy catheter 24 is formed so that a portion (the mantle portion 212) of the insertion jig (obturator 21) for inserting the gastrostomy catheter 24 into the stomach can be inserted, and the cap 25 has the locked portion (locked block 25*c*) which is locked to the locking claw 212*b* of the obturator 21.

Since the cap 25 has the locked block 25*c* which is locked by the locking claw 212*b* of the obturator 21, the cap 25 can be prevented from being unexpectedly detached from the gastrostomy catheter 24.

In particular, facing two pieces of a distal end portion of the mantle portion 212 form a bent end portion 212*a* which is bent so as to approach an axis toward a distal end in a natural state. A distal end of the bent end portion 212*a* is formed so as to be located on the axis side with respect to a size between the outer surfaces of the inner insertion portion 23, and the locking claw 212*b* locked to a distal end portion of the locked block 25*c* is formed so as to protrude in the axial direction from the distal end of the bent end portion 212*a*.

As illustrated in FIG. 24, the inner insertion portion 23 pushed in to the distal side with respect to the mantle portion 212 abuts on the bent end portion 212*a*, which is a portion of the inner wall surface of the mantle portion 212, to expand the bent end portion 212*a* of the mantle portion 212. Accordingly, the locking by the locking portion (the locking claw 212*b*) can be released.

Particularly, unlike the mantle portion 22 according to the above embodiment, the facing two pieces of the distal end portion of the mantle portion 212 do not protrude radially outward from other sites of the mantle portion 212. Accordingly, the inner wall of the gastrostomy catheter 24 does not hinder the deformation. Therefore, compared with the mantle portion, the locked state between the mantle portion 212 and the cap 25 can be released more smoothly than in the mantle portion 22.

The present invention is not limited to the configuration in which the bent end portions 212*a* are provided on the facing two pieces of the distal end portion of the mantle portion 212. That is, the number of the bent end portions 212*a* is arbitrary, and the bent end portions 212*a* may be provided in all of the four divided pieces in the distal end portion of the mantle portion 212. If the bent end portions 212*a* are provided in all of the four pieces, each of the bent end portions 212*a* disposed at four positions at every 90° in a circumferential direction of the mantle portion 212 is locked to a constricted portion of the locked block 25*c* of the cap 25. Therefore, it is possible to more suitably maintain the locked state with respect to the cap 25.

Further, as described above, since the plurality of bent end portions 212*a* are further formed, when the tip portion of the mantle portion 212 is further formed of a plurality of pieces, the bent end portions 212*a* may be provided in an arbitrary plurality of pieces.

Modification Example 2-2

In the above embodiment, the example is described in which the locking claws 22*b* and 212*b* of the mantle portions 22 and 212 are locked to the locked block 25*c* of the cap 25. However, the present invention is not limited to this configuration.

Figure 25:
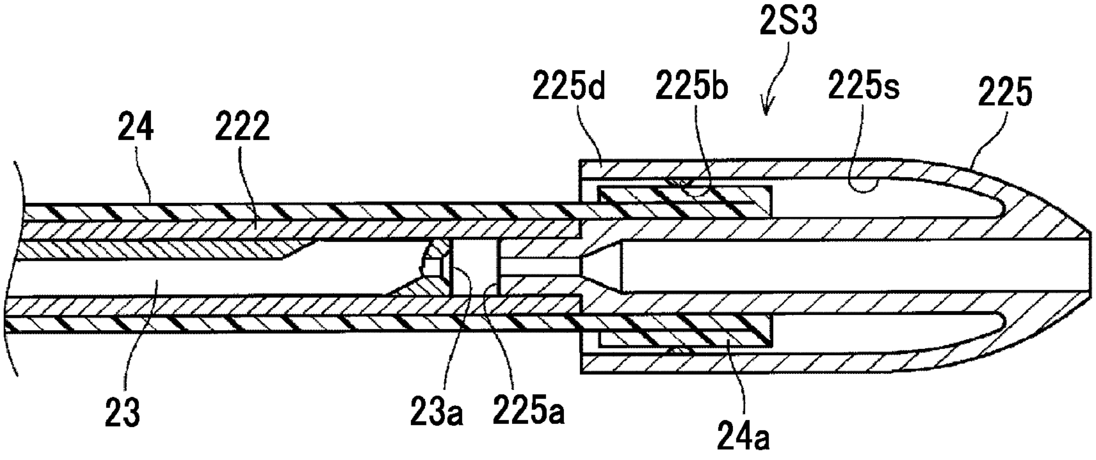
FIG. 25 is a cross-sectional view illustrating a locking structure between a gastrostomy catheter and a cap according to Modification Example 2-2.

Next, a locking structure according to Modification Example 2-2 will be described mainly with reference to FIG. 25. FIG. 25 is a cross-sectional view illustrating a locking structure between the gastrostomy catheter 24 and a cap 225 according to Modification Example 2-2.

A gastrostomy catheter set 2S3 according to the present modification example is configured to include the gastrostomy catheter 24 having the foldable gastrointestinal fixing portion (bumper 24*a*) at the tip, and the cap 225 covering at least a portion of the folded bumper 24*a*. The gastrostomy catheter 24 is formed so that a portion (the mantle portion 222) of the insertion jig (obturator 21) for inserting the gastrostomy catheter 24 into the stomach can be inserted.

The cap 225 according to the present modification example has a locking portion (locking protrusion 225*b*) which is locked to the bumper 24*a* of the gastrostomy catheter 24.

For example, the locking protrusion 225*b* is made of an elastic material, and is configured so that the bumper 24*a* is accommodated in a space 225*s* of the cap 225 and is compressed and deformed by a load radially outward from the outer peripheral surface of the bumper 24*a*. The cap 225 is locked to the bumper 24*a* by a frictional force due to an elastic restoring force of the locking protrusion 225*b*.

According to this locking structure, since the cap 225 is locked to the gastrostomy catheter 24, the cap 225 can be prevented from being unexpectedly detached from the gastrostomy catheter 24.

When the locking by the locking protrusion 225*b* is released, as in the above embodiment, a distal end surface 23*a* of the inner insertion portion 23 abuts on a proximal end surface 225*a* of the cap 225, and the inner insertion portion 23 may be pushed to the distal side up to the position at which the locking protrusion 225*b* is detached from the bumper 24*a*.

In addition, a locking portion (not illustrated) which is locked to the inner surface of the peripheral wall 225*d* of the cap 225 may be provided on the bumper 24*a* of the gastrostomy catheter 24 without providing the locking protrusion 225*b* on the inner surface of the peripheral wall 225*d* of the cap 225.

Modification Example 2-3

In Modification Example 2-2, the cap 225 having the locking protrusion 225*b* for locking the umbrella-shaped bumper 24*a* is described. However, the present invention is not limited to this configuration.

Figure 26:
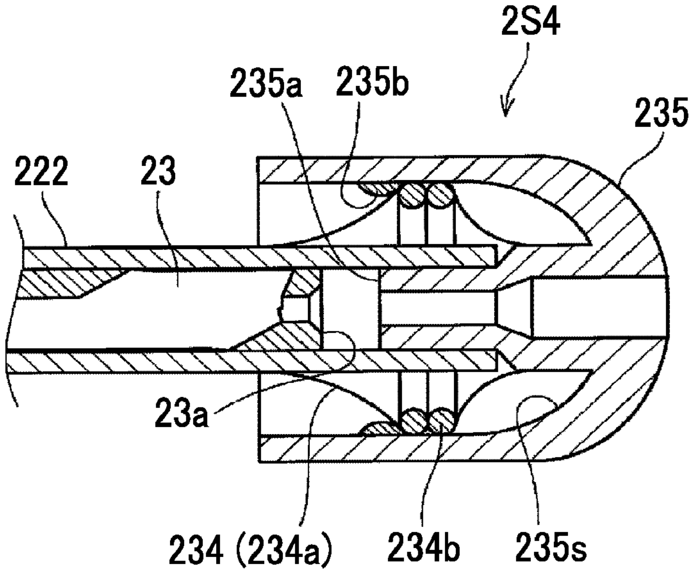
FIG. 26 is a cross-sectional view illustrating a locking structure between a gastrostomy catheter and a cap according to Modification Example 2-3 and a view illustrating a locked state.

Next, a locking structure according to Modification Example 2-3 will be described mainly with reference to FIGS. 26 and 27. FIG. 26 is a cross-sectional view illustrating a locking structure between a gastrostomy catheter 234 and a cap 235 according to the Modification Example 2-3 and is a view illustrating a locked state.

Figure 27:
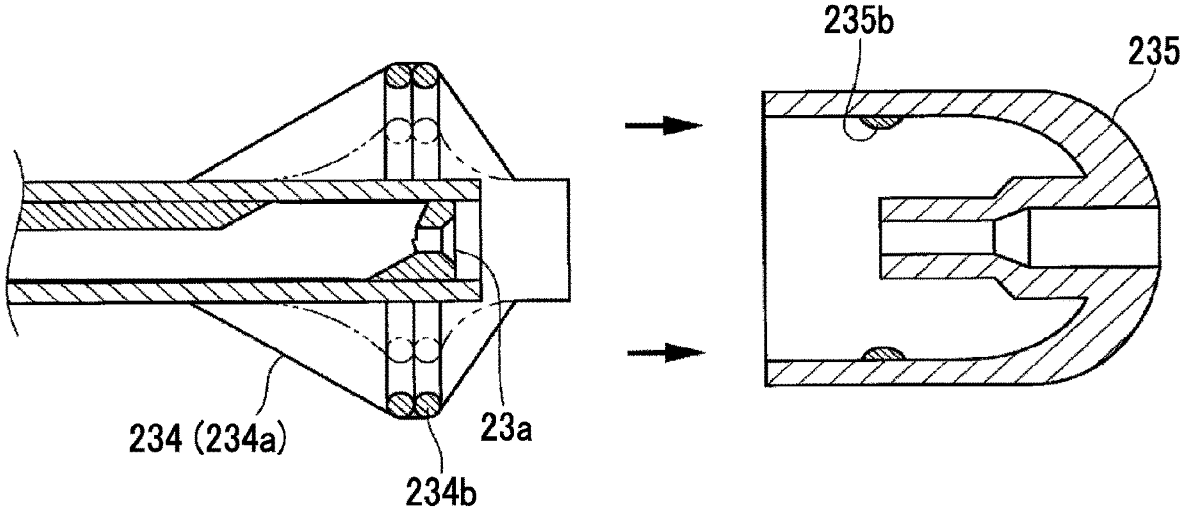
FIG. 27 is a cross-sectional view illustrating the locking structure between the gastrostomy catheter and the cap according to Modification Example 2-3 and is a view illustrating an unlocked state.

FIG. 27 is a cross-sectional view illustrating the locking structure between the gastrostomy catheter 234 and the cap 235 and is a view illustrating an unlocked state.

The gastrostomy catheter set 2S4 according to the present modification example is configured to include the gastrostomy catheter 234 having a foldable gastrointestinal fixing portion (bumper 234*a*) at the tip, and the cap 235 covering at least a portion of the folded bumper 234*a*.

The gastrostomy catheter 234 is formed so that a portion (mantle portion 222) of the insertion jig for inserting the gastrostomy catheter 234 into the stomach can be inserted, and the cap 235 has the locking portion (locking protrusion 235*b*) which is locked to the gastrostomy catheter 234.

In particular, the bumper 234*a* includes a wire 234*b* which is coiled inside the bumper 234*a*. The bumper 234*a* is accommodated in the space 235*s* of the cap 235 in a state in which the wire 234*b* is contracted toward an axis of the bumper 234*a* from the natural state.

When the locking protrusion 235*b* of the cap 235 abuts on the wire 234*b* inside the bumper 234*a* via the bumper 234*a*, the cap 235 is locked to the gastrostomy catheter 234.

The inner insertion portion 23 is configured to be movable forward through the mantle portion 222 up to a position at which the inner insertion portion 23 abuts on a proximal end portion (proximal end surface 235*a*) of the cap 235 and the cap 235 can be detached from the gastrostomy catheter 234 and the mantle portion 222. Specifically, the distal end surface 23*a* of the inner insertion portion 23 abuts on a proximal end surface 235*a* of the cap 235, and the cap 235 is pushed in a distal direction by the inner insertion portion 23 up to a position at which the locking protrusion 235*b* crosses the wire 234*b*. By pushing the cap 235 in this manner, the cap 235 can be detached from the gastrostomy catheter 234 as illustrated in FIG. 27.

The surgeon removes the cap 235 in the body, and thus, the surgeon can increase a diameter of the bumper 234*a* by biasing when the wire 234*b* is restored in a diameter-increasing direction. A diameter of the bumper 234*a* increases to be larger than a diameter of a fistula (not illustrated), and thus, a distal end of the gastrostomy catheter 234 is placed in the stomach.

The configuration is described in which the locking protrusions 225*b* and 235*b* of the caps 225 and 235 according to the above modification example are locked to the portions of the bumpers 24*a* and 234*a* of the gastrostomy catheters 24 and 234. However, the present invention is limited to this configuration, the locking protrusions 225*b* and the 235*b* may be locked to the shaft portion.

Further, in the above embodiment, the configuration is described in which the inner insertion portion 23 directly abuts on the member including the locking portion or a member to be locked and presses the member and the locking by the locking portion is released. However, the inner insertion portion 23 may indirectly press the member via a third member to release the locking.

The present embodiment includes the following technical concepts.

(1) A gastrostomy catheter including: a shaft in which a lumen is provided; a flexible bumper which is provided at a tip of the shaft; and a linear member which has elasticity and biases the bumper in a diameter-increasing direction or restricts deformation of the bumper in a diameter-decreasing direction.

(2) In the gastrostomy catheter according to (1), the linear member is configured to be changed to a first state in which at least a portion of the linear member is disposed in the bumper and the bumper is biased radially outward or the deformation of the bumper in the diameter-decreasing direction is restricted, and a second state in which the linear member is disposed closer to a base end side of the bumper or the linear member is pulled out closer to a proximal side from the bumper than when the linear member is in the first state, and the linear member biases the bumper radially outward lower than when the linear member is in the first state or does not bias the bumper, or the linear member allows the deformation of the bumper in the diameter-decreasing direction more than when the linear member is in the first state.

(3) In the gastrostomy catheter according to (1) or (2), a fixing portion for holding the gastrostomy catheter at a predetermined position is provided at a base end portion of the shaft, and a base end holding portion which holds a base end portion of the linear member is provided in the fixing portion or on a proximal side from a distal end of the fixing portion.

(4) In the gastrostomy catheter according to (3), the base end holding portion holds the base end portion by the base end portion of the linear member being embedding in the base end holding portion and is provided to be cuttable to the fixing portion.

(5) In the gastrostomy catheter according to (3), the base end holding portion is detachably attached to the fixing portion.

(6) In the gastrostomy catheter according to any one of (1) to (5), the lumen includes a main lumen for injecting a nutrient and a sub-lumen which accommodates at least a portion of the linear member, and a tip opening portion of the sub-lumen is continuous with an inside of the bumper.

(7) In the gastrostomy catheter according to (6), a portion of an inner wall of the bumper is located on an extension of the sub-lumen.

(8) In the gastrostomy catheter according to (6) or (7), a tip portion of the sub-lumen is formed to be bent outward in a radial direction of the bumper.

(9) In the gastrostomy catheter according to any one of (6) to (8), in a state in which the linear member is disposed over the sub-lumen and the bumper, a site of the linear member disposed in the sub-lumen and a site thereof disposed in the bumper are bent and formed continuously.

(10) In the gastrostomy catheter according to (9), in the state in which the linear member is disposed over the sub-lumen and the bumper, at least a portion of the site of the linear member disposed in the bumper is bent and formed to extend in a direction along an inner peripheral surface of the bumper.

(11) In the gastrostomy catheter according to any one of (1) to (10), a communication hole which allows an inside and an outside of the bumper to communicate with each other is formed in the bumper, and a tip portion of the linear member is disposed so as to be movable in the bumper and put in and out of the bumper through the communication hole.

(12) In the gastrostomy catheter according to any one of (1) to (11), at least a tip portion of the linear member is covered with a coating portion having a hardness lower than that of the linear member or is formed to be blunt.

(13) The gastrostomy catheter according to any one of (1) to (12), further including: a cover which holds and accommodates the folded bumper, in which the cover holds and accommodates the bumper in a state in which at least a portion of the linear member disposed in the bumper.

(14) In the gastrostomy catheter according to any one of (1) to (13), a maximum diameter portion of the bumper is formed at a position separated from the tip of the shaft toward a tip side.

(15) In the gastrostomy catheter according to any one of (1) to (14), a concave portion which is depressed in a radial direction of the bumper and extends along an axial direction of the bumper is formed on a surface of the bumper.

(16) In the gastrostomy catheter according to (15), the bumper includes a large diameter portion having a maximum diameter portion and a small diameter portion provided on a tip side from the large diameter portion, a plurality of the concave portions are formed in each of the large diameter portion and the small diameter portion, and the concave portions in the large diameter portion and the small diameter portion are formed at corresponding positions in a circumferential direction of the bumper.

(17) In the gastrostomy catheter according to any one of (1) to (16), the bumper includes an inner layer and an outer layer, a space is provided between the inner layer and the outer layer, and a portion of the linear member is disposed in the space.

(18) In the gastrostomy catheter according to (17), the bumper includes a large diameter portion having a maximum diameter portion and a small diameter portion provided on a tip side of the large diameter portion, the inner layer and the outer layer are separated from each other in the large diameter portion, and the inner layer and the outer layer are in contact with each other in the small diameter portion.

(19) In the gastrostomy catheter according to (1) or (2), the shaft has a tip portion which is formed to have a diameter smaller than those of other sites, and the bumper extends from the tip portion of the shaft.

(20) In the gastrostomy catheter according to (3), the fixing portion includes a support portion which movably supports the base end holding portion, and a restriction unit which is connected to the support portion, is provided on a direction in which the base end holding portion is detached from the support portion, and restricts a movement of the base end holding portion and detachment of the base end holding portion from the support portion, and the base end holding portion is configured so as to be separable from the support portion by the restriction unit being separated from the support portion.

(21) In the gastrostomy catheter according to (20), the base end holding portion has an inverted tapered portion formed to expand toward an outside of the fixing portion, the support portion includes a facing portion which extends along the inverted tapered portion, and the support portion is configured to be deformable so that the facing portion abuts on the inverted tapered portion and the base end holding portion is pushed into the outside of the fixing portion after the restriction unit is separated from the support portion.

(22) In an insertion jig set for inserting a gastrostomy catheter having a foldable gastrointestinal fixing portion at a tip into a body, the insertion jig set including: an insertion jig configured to include a tubular mantle portion and an inner insertion portion which is movable forward and rearward through the mantle portion; the gastrostomy catheter which is attached around the mantle portion; and a cap which is disposed on a tip side of the mantle portion and covers at least a portion of the folded gastrointestinal fixing portion, in which one of the gastrostomy catheter or the mantle portion and the cap has a locking portion which is locked to the other, and the inner insertion portion releases locking by the locking portion when the inner insertion portion moves forward through the mantle portion.

(23) In the insertion jig set according to (22), the locking portion is provided on an inner wall surface of the mantle portion and is configured to be lockable to the cap, and the inner insertion portion abuts on a portion of the inner wall surface of the mantle portion to expand the mantle portion, and thus, releases the locking by the locking portion.

(24) In the insertion jig set according to (23), a protrusion protruding radially inward is formed on the inner wall surface of the mantle portion, the protrusion is disposed on a proximal side from the locking portion, and the inner insertion portion abuts on the protrusion to expand the mantle portion when the inner insertion portion moves forward through the mantle portion.

(25) In the insertion jig set according to (23) or (24), a slit is formed at a tip portion of the mantle portion, and the slit extends in an axial direction of the mantle portion up to a tip of the mantle portion.

(26) In the insertion jig set according to any one of (22) to (25), the inner insertion portion is configured to be movable forward up to a position at which the inner insertion portion abut on a proximal end portion of the cap and the cap is detachable from the gastrostomy catheter and the mantle portion.

(27) In the insertion jig set according to any one of (22) to (26), at least a portion of the gastrointestinal fixing portion is accommodated in a portion of a space in the cap except for the locking portion or a site locked to the locking portion.

(28) In an insertion jig for inserting a gastrostomy catheter having a foldable gastrointestinal fixing portion at a tip and a cap covering at least a portion of the folded gastrointestinal fixing portion into a body, the insertion jig including: a tubular mantle portion around which the gastrostomy catheter is attachable; and an inner insertion portion which passes through the mantle portion, in which the mantle portion has a locking portion which is locked to the cap, and the inner insertion portion releases locking by the locking portion when the inner insertion portion moves forward through the mantle portion.

(29) A gastrostomy catheter set including: a gastrostomy catheter which has a foldable gastrointestinal fixing portion at a tip; and a cap which covers at least a portion of the folded gastrointestinal fixing portion, in which the gastrostomy catheter is formed so that a portion of an insertion jig for inserting the gastrostomy catheter into the stomach is inserted, and the cap has a locked portion which is locked to the insertion jig.

(30) A gastrostomy catheter set including: a gastrostomy catheter which has a foldable gastrointestinal fixing portion at a tip; and a cap which covers at least a portion of the folded gastrointestinal fixing portion, in which the gastrostomy catheter is formed so that a portion of an insertion jig for inserting the gastrostomy catheter into the stomach is inserted, and one of the gastrostomy catheter and the cap has a locking portion which is locked to the other.

INDUSTRIAL APPLICABILITY

It is possible to provide a gastrostomy catheter capable of reducing time and effort required for management while keeping a resistance applied to a body low and capable of being placed for a relatively long time. Further, it is possible to provide an insertion jig set, an insertion jig, and a gastrostomy catheter set capable of preventing the cap from being unexpectedly detached from the gastrostomy catheter and capable of suitably removing the cap.

REFERENCE SIGNS LIST

11: gastrostomy catheter
12: shaft
13: bumper
13*a*: communication hole
14: wire (linear member)
14*a*: base end portion
14*b*: tip portion
14*c*: coating portion
14*j*, 14*k*: bending point
14*x*: first site
14*y*: second site
15: extracorporeal fixing unit (fixing portion)
15*a*: distal end
15*b*: marker
15*c*: base end holding portion
16: cap
17: strap
18: main lumen (lumen)
18*a*: opening
19: sub-lumen (lumen)
19*a*: base end portion
19*b*: tip opening portion
110: capsule cover
111: insertion jig
111*a*: main body tube
111*b*: claw
111*c*: operation unit
111*d*: piston
111*e*: extrusion rod
113: bumper
113*a*: communication hole
115: extracorporeal fixing unit (fixing portion)
115*a*: base end holding portion
115*b*: locking protrusion

115*c*: concave groove
122: shaft
129: sub-lumen (lumen)
129*b*: tip opening portion
132: shaft
132*a*: shaft main body
132*b*: first tip portion (tip portion)
132*c*: second tip portion (tip portion)
132*d*: sub-lumen
133: bumper
133*s*: space
134: inner layer
134*a*: connection tubular portion
134*b*: inclined portion
134*c*: concave portion
134*d*: tip portion
134*e*: concave portion
135: outer layer
135*a*: connection tubular portion
135*b*: large diameter portion
135*c*, 135*d*: inclined portion
135*e*: maximum diameter portion
135*f*: concave portion
135*g*: small diameter portion
135*h*: concave portion
145: extracorporeal fixing unit (fixing portion)
146: support portion
146*a*: facing portion
146*b*: connection wall
146*c*: bottom wall
146*d*: opening
146*e*: through hole
147: restriction piece (restriction unit)
148: base end holding portion
148*a*: inverted tapered portion
150: abdominal wall
151: stomach wall
152: inside stomach
153: fistula
1α, 1α1, 1α2: incident angle
2S: insertion jig set
2S1, 2S2, 2S3, 2S4: gastrostomy catheter set
21: obturator (insertion jig)
22: mantle portion
22*a*: protrusion
22*b*: locking claw (locking portion)
22*c*: slit
22*d*: holding portion
23: inner insertion portion
23*a*: distal end surface
23*b*: operation unit
24: gastrostomy catheter
24*a*: bumper (gastrointestinal fixing portion)
24*b*: extracorporeal fixing portion
24*c*: shaft
25: cap
25*a*: proximal end surface
25*b*: shaft center portion
25*c*: locked block (locked portion)
25*d*: peripheral wall
25*e*: through hole
25*s*: space
212: mantle portion
212*a*: bent end portion
212*b*: locking claw (locking portion)
222: mantle portion
225: cap
225*a*: proximal end surface
225*b*: locking protrusion (locking portion)
225*d*: peripheral wall
225*s*: space
234: gastrostomy catheter
234*a*: bumper (gastrointestinal fixing portion)
234*b*: wire
235: cap
235*a*: proximal end surface
235*b*: locking protrusion (locking portion)
235*s*: space

The invention claimed is:

1. A gastrostomy catheter, comprising:
- a shaft having a lumen;
- a flexible bumper positioned at a tip of the shaft; and
- a linear member having elasticity and having at least a portion positioned along an inner peripheral surface of the flexible bumper inside the flexible bumper such that the linear member is elastically deformed and bent along the inner peripheral surface of the flexible bumper inside the flexible bumper and biases the flexible bumper from inside the flexible bumper in a diameter-increasing direction by the elasticity of the linear member,
- wherein the flexible bumper has a communication hole configured to allow an inside and an outside of the flexible bumper to communicate with each other, the linear member has a tip portion configured to be moved in the flexible bumper and put in and out of the flexible bumper through the communication hole, and the flexible bumper has a surface having a concave portion which is depressed in a radial direction of the flexible bumper and extends along an axial direction of the flexible bumper.

2. The gastrostomy catheter according to claim 1, wherein the linear member is configured to be changed to a first state in which the at least a portion of the linear member is disposed in the flexible bumper and the flexible bumper is biased radially outward, and a second state in which the linear member is disposed closer to a base end side of the flexible bumper than the linear member in the first state, and the linear member biases the flexible bumper radially outward less than the linear member in the first state.

3. The gastrostomy catheter according to claim 1, further comprising:
- a fixing portion positioned at a base end portion of the shaft such that the gastrostomy catheter is held at a predetermined position,
- wherein the fixing portion has a base end holding portion in the fixing portion or on a proximal side from a distal end of the fixing portion such that the base end holding portion holds a base end portion of the linear member.

4. The gastrostomy catheter according to claim 3, wherein the base end holding portion holds the base end portion by the base end portion of the linear member being embedded in the base end holding portion and is provided to be cuttable to the fixing portion.

5. The gastrostomy catheter according to claim 3, wherein the base end holding portion is detachably attached to the fixing portion.

6. The gastrostomy catheter according to claim 1, wherein the lumen of the shaft includes a main lumen configured to inject a nutrient and a sub-lumen configured to accommodate at least a portion of the linear member, and a tip opening portion of the sub-lumen in the shaft is continuous with an inside of the flexible bumper.

7. The gastrostomy catheter according to claim 6, wherein a portion of an inner wall of the flexible bumper is positioned on an extension of the sub-lumen in the shaft.

8. The gastrostomy catheter according to claim 6, wherein a tip portion of the sub-lumen in the shaft is formed to be bent outward in a radial direction of the flexible bumper.

9. The gastrostomy catheter according to claim 6, wherein in a state in which the linear member is disposed over the sub-lumen of the shaft and the flexible bumper, a site of the linear member disposed in the sub-lumen of the shaft and a site thereof disposed in the flexible bumper are bent and formed continuously.

10. The gastrostomy catheter according to claim 9, wherein in the state in which the linear member is disposed over the sub-lumen of the shaft and the flexible bumper, at least a portion of the site of the linear member disposed in the flexible bumper is bent and formed to extend in a direction along an inner peripheral surface of the flexible bumper.

11. The gastrostomy catheter according to claim 1, wherein at least a tip portion of the linear member is covered with a coating portion having a hardness lower than a hardness of the linear member or is formed to be blunt.

12. The gastrostomy catheter according to claim 1, further comprising:

a cover configured to hold and accommodate the flexible bumper such that the flexible bumper is a folded bumper and that the cover holds and accommodates the flexible bumper in a state in which at least a portion of the linear member is disposed in the flexible bumper.

13. The gastrostomy catheter according to claim 1, wherein a maximum diameter portion of the flexible bumper is formed at a position separated from the tip of the shaft toward a tip side.

14. The gastrostomy catheter according to claim 1, wherein the flexible bumper includes a large diameter portion having a maximum diameter portion and a small diameter portion provided on a tip side from the large diameter portion, and the concave portion is formed in a plurality such that the plurality of concave portions is formed in the large diameter portion and the small diameter portion, respectively, and that the concave portions in the large diameter portion and the small diameter portion are formed at corresponding positions in a circumferential direction of the flexible bumper.

15. The gastrostomy catheter according to claim 1, wherein the flexible bumper includes an inner layer and an outer layer, a space is provided between the inner layer and the outer layer, and a portion of the linear member is disposed in the space.

16. The gastrostomy catheter according to claim 15, wherein the flexible bumper includes a large diameter portion having a maximum diameter portion and a small diameter portion provided on a tip side of the large diameter portion, the inner layer and the outer layer are separated from each other in the large diameter portion, and the inner layer and the outer layer are in contact with each other in the small diameter portion.

17. The gastrostomy catheter according to claim 1, wherein the shaft has a tip portion formed to have a diameter smaller than diameters of other portions, and the flexible bumper extends from the tip portion of the shaft.

18. The gastrostomy catheter according to claim 3, wherein the fixing portion includes a support portion which movably supports the base end holding portion, and a restriction unit which is connected to the support portion, is provided on a direction in which the base end holding portion is detached from the support portion and restricts a movement of the base end holding portion and detachment of the base end holding portion from the support portion, and the base end holding portion is formed to be separable from the support portion by the restriction unit being separated from the support portion.

19. The gastrostomy catheter according to claim 18, wherein the base end holding portion has an inverted tapered portion formed to expand toward an outside of the fixing portion, the support portion includes a facing portion which extends along the inverted tapered portion, and the support portion is deformable such that the facing portion abuts the inverted tapered portion and the base end holding portion is pushed into the outside of the fixing portion after the restriction unit is separated from the support portion.

20. A gastrostomy catheter, comprising:

a shaft having a lumen;

a flexible bumper positioned at a tip of the shaft; and a linear member having elasticity and having at least a portion positioned along an inner peripheral surface of the flexible bumper inside the flexible bumper such that the linear member is elastically deformed and bent along the inner peripheral surface of the flexible bumper inside the flexible bumper and biases the flexible bumper from inside the flexible bumper in a diameter-increasing direction by the elasticity of the linear member, wherein the flexible bumper has a communication hole configured to allow an inside and an outside of the flexible bumper to communicate with each other, and the linear member has a tip portion configured to be moved in the flexible bumper and put in and out of the flexible bumper through the communication hole.

* * * * *